US010153918B2

(12) United States Patent
Olmsted-Thompson

(10) Patent No.: US 10,153,918 B2
(45) Date of Patent: Dec. 11, 2018

(54) JOINING AN APPLICATION CLUSTER

(71) Applicant: Nicira, Inc., Palo Alto, CA (US)

(72) Inventor: Jeremy Olmsted-Thompson, New York, NY (US)

(73) Assignee: NICIRA, INC., Palo Alto, CA (US)

(*) Notice: Subject to any disclaimer, the term of this patent is extended or adjusted under 35 U.S.C. 154(b) by 343 days.

(21) Appl. No.: 14/838,306

(22) Filed: Aug. 27, 2015

(65) Prior Publication Data

US 2017/0063676 A1  Mar. 2, 2017

(51) Int. Cl.
H04L 12/24 (2006.01)
H04L 12/46 (2006.01)
H04L 12/751 (2013.01)
H04L 12/715 (2013.01)
H04L 12/725 (2013.01)

(52) U.S. Cl.
CPC .......... H04L 12/4633 (2013.01); H04L 45/02 (2013.01); H04L 45/64 (2013.01); *H04L 45/306* (2013.01)

(58) Field of Classification Search
CPC ..... H04L 12/4633; H04L 45/02; H04L 45/64; H04L 45/306
USPC ......................................................... 709/217
See application file for complete search history.

(56) References Cited

U.S. PATENT DOCUMENTS

| 7,035,858 | B2 | 4/2006 | Dinker et al. |
| 8,296,434 | B1 * | 10/2012 | Miller ................. H04L 67/1004 709/220 |
| 8,645,576 | B2 | 2/2014 | Farinacci et al. |
| 9,356,866 | B1 | 5/2016 | Sivaramakrishnan et al. |
| 9,432,287 | B2 | 8/2016 | Benny et al. |
| 9,628,379 | B2 | 4/2017 | Nedeltchev et al. |
| 9,699,277 | B2 | 7/2017 | Banavalikar et al. |
| 9,825,822 | B1 | 11/2017 | Holland |
| 9,838,240 | B1 | 12/2017 | Cormie et al. |
| 2006/0153068 | A1 | 7/2006 | Daily et al. |
| 2007/0156842 | A1 | 7/2007 | Vermeulen et al. |
| 2007/0244937 | A1 | 10/2007 | Flynn et al. |

(Continued)

OTHER PUBLICATIONS

Author Unknown, "Encapsulation (computer programming)," 2018, 5 pages, Wikipedia, retrieved at https://en.wikipedia.org/wiki/Encapsulation_(computer_programming).

(Continued)

*Primary Examiner* — Ario Etienne
*Assistant Examiner* — Elizabeth Kassa
(74) *Attorney, Agent, or Firm* — Adeli LLP

(57) ABSTRACT

Some embodiments provide a method, for a first cluster manager (CM), for adding an application instance (AI) to a cluster operating across several datacenters. The method identifies a first AI to add to the cluster and a second AI that already belongs to the cluster, and sends a request to add the first AI to a second CM that operates on a same machine as the second AI. The request includes an address for the first AI and a datacenter identifier that indicates a datacenter in which the first AI operates. From the second CM, the method receives a cluster topology that identifies several AIs of the cluster within the several datacenters. The topology includes a datacenter identifier for each of the identified AIs. The method processes data sent between the first AI and other AIs of the cluster according to an overlay network defined by the received topology.

20 Claims, 15 Drawing Sheets

(56) References Cited

U.S. PATENT DOCUMENTS

| | | |
|---|---|---|
| 2007/0300239 A1 | 12/2007 | Adam et al. |
| 2009/0037607 A1 | 2/2009 | Farinacci et al. |
| 2010/0162036 A1 | 6/2010 | Linden et al. |
| 2011/0320821 A1* | 12/2011 | Alkhatib ............ H04L 29/12264 713/176 |
| 2013/0014227 A1* | 1/2013 | Larson .............. H04L 29/12066 726/4 |
| 2013/0089093 A1 | 4/2013 | Bacthu et al. |
| 2013/0339475 A1* | 12/2013 | Kataria .................. H04L 45/46 709/217 |
| 2014/0108483 A1* | 4/2014 | Tarta ..................... G06F 9/5072 709/201 |
| 2014/0129700 A1 | 5/2014 | Mehta et al. |
| 2014/0254603 A1* | 9/2014 | Banavalikar ............ H04L 69/03 370/401 |
| 2014/0317273 A1* | 10/2014 | Kruglick ................ H04L 43/04 709/224 |
| 2015/0063353 A1 | 3/2015 | Kapadia et al. |
| 2015/0081907 A1* | 3/2015 | Scharf .................... H04L 67/10 709/226 |
| 2015/0163323 A1 | 6/2015 | Moreno et al. |
| 2015/0195178 A1 | 7/2015 | Bhattacharya et al. |
| 2015/0229715 A1* | 8/2015 | Sankar ................ H04L 41/0893 709/203 |
| 2015/0264121 A1* | 9/2015 | Van Biljon ............ G06Q 30/04 709/201 |
| 2015/0271067 A1 | 9/2015 | Li et al. |
| 2016/0036686 A1* | 2/2016 | Vendrow ............... H04L 45/306 370/254 |
| 2016/0127320 A1 | 5/2016 | Badoni et al. |
| 2016/0134528 A1 | 5/2016 | Lin et al. |
| 2016/0173584 A1* | 6/2016 | Fitzpatrick .......... H04L 67/1008 709/223 |
| 2017/0005923 A1 | 1/2017 | Babakian |
| 2017/0019430 A1 | 1/2017 | Cohn |

OTHER PUBLICATIONS

Mohapatra, Pradosh, et al., "The BGP Encapsulation Subsequent Address Family Identifier (SAFI) and the BGP Tunnel Encapsulation Attribute," RFC 5512, Apr. 2009, 14 pages.

Sajassi, Ali, et al., "A Network Virtualization Overlay Solution Using Ethernet VPN (EVPN)," RFC 8365, Mar. 2018, 34 pages, IEFT.

Sajassi, Ali, et al., "BGP MPLS-Based Ethernet VPN," RFC 7432, Feb. 2015, 57 pages, IETF.

* cited by examiner

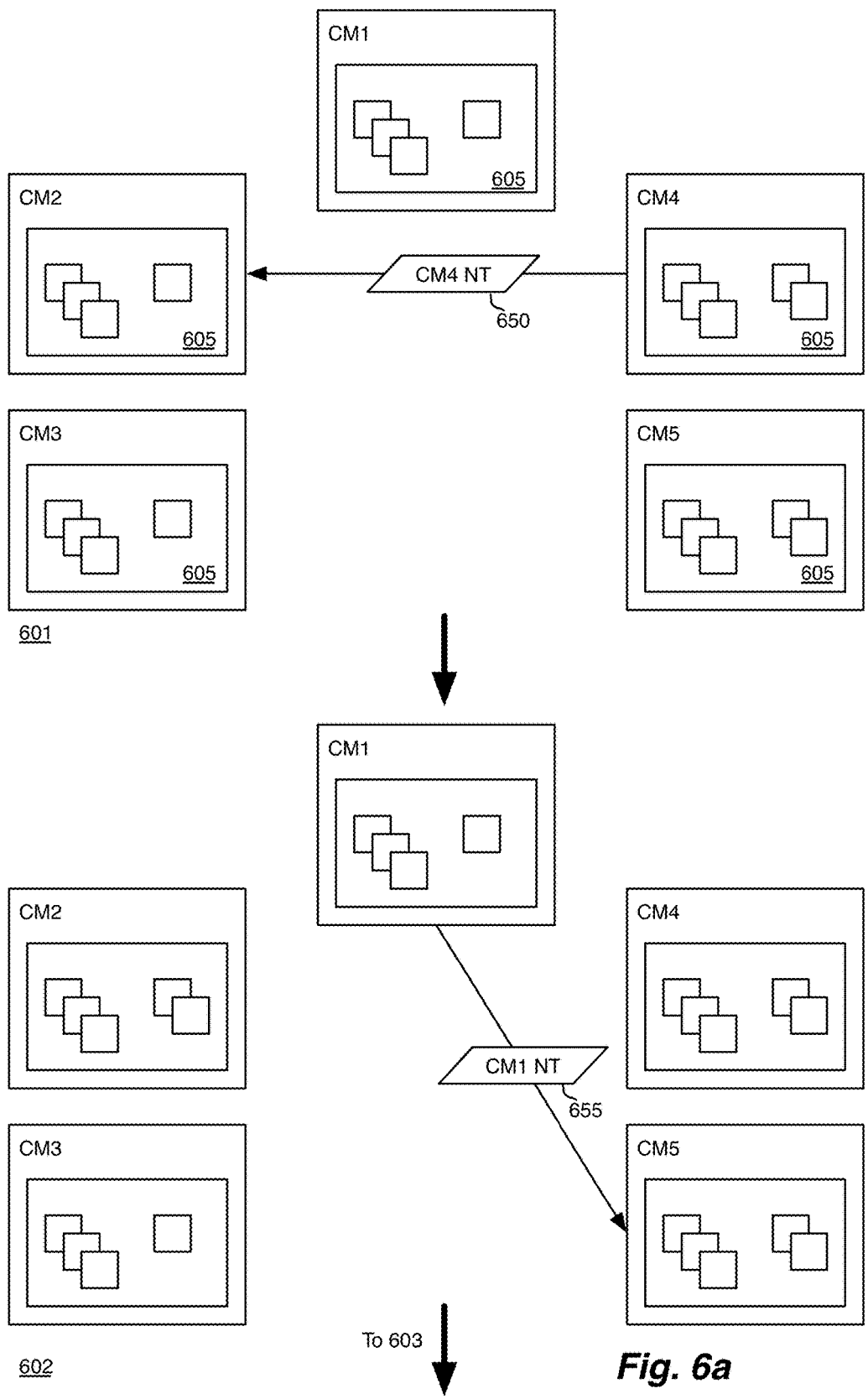

JOINING AN APPLICATION CLUSTER

BACKGROUND

Applications are becoming increasingly complex and are often distributed across multiple instances. To further exacerbate the already challenging task of building a distributed system, applications are increasingly being deployed across multiple datacenters. As processing requirements increase and as processing capabilities become available in different datacenters in a hybrid cloud, scaling the distributed applications with cross-datacenter deployment capabilities becomes increasingly difficult.

Some existing solutions to inter-datacenter networking hide the separation between datacenters, making it difficult to efficiently process data with respect to the different datacenters. Traffic between datacenters has higher latency and is more likely to suffer from packet loss than when confined to a single network, so it is desirable to route and/or batch communications to minimize traffic between datacenters. However, by hiding the separation between datacenters (i.e., treating each application instance as though it were operating in a single datacenter), communication between the application instances of a distributed application becomes increasingly inefficient as the application grows.

Alternatively, some distributed applications require that datacenter-aware processing be built into the distributed application, requiring significant development resources as each application must track the locations of the various application instances and route the data between the various application instances. Complicated routes must be managed and tracked between each pair of individual application instances in a cluster. In order to maintain connectivity, the cluster topology must be continuously monitored in order to update the routes and compensate for partitions, failures and additions.

Some existing solutions provide a more generalized solution, but still require significant management resources as the locations and connections between the various instances must be managed as instances are added and removed. For example, in some cases, the distributed application requires an admin to create and maintain a VPN across a variety of public cloud infrastructures, leading to significant usability issues. Other alternatives involve treating each datacenter as a mostly-independent application with some special case logic for routing and/or batching communication between datacenters. However, such solutions require significant engineering effort when adding new features.

Some alternatives provide federated management of the various application instances, with centralized control and management for the application instances at the different datacenters, but such solutions often require significant management resources (e.g., for setup, configuration, and maintenance), or have strict requirements for interconnectivity of the various application instances. For example, some solutions simplify the problem by requiring that all application instances across all datacenters form a fully connected graph. This removes the need for complicated routing logic, but also prevents deployment in certain circumstances due to policy or security concerns. As such, a generalized, datacenter-aware, and simplified solution for the deployment of distributed applications across multiple datacenters is needed.

BRIEF SUMMARY

Some embodiments of the invention provide a cluster manager that operates on machines in a network to create a self-managing overlay network that provides both cluster membership and topology, as well as routing. The overlay network allows distributed applications to replicate data and segregate functionality based on application instance location without needing to directly manage the cluster topology. The overlay network also allows cross-datacenter communication to be sent in a way that appears direct irrespective of the underlying configuration.

The self-managing overlay network provides an application-level solution to the problem of inter-datacenter networking for a cluster of application instances. In some embodiments, the self-managing overlay network is a "datacenter aware" system that provides a programmatic interface for applications, in order to extend the capabilities of applications without requiring customers to develop and maintain elaborate network configurations and without compromising application features. Many components can be expanded to communicate across datacenters with minimal effort, and engineers are shielded from the distraction of the underlying cluster topology while still allowing low level access as necessary.

Some embodiments provide a method for providing access to a cluster topology for a cluster of application instances operating across several datacenters. The method of some embodiments provides a distributed cluster manager that tracks application instances in the cluster, tracking to which datacenter each application instance belongs. The distributed cluster manager of some embodiments also supports marking certain application instances (or the machines on which they operate) as access points to a cluster—these are the subset of application instances in each datacenter visible from one or more other datacenters or from the public Internet.

The cluster manager, or overlay daemon, of some embodiments provides both (i) programmatic access to the cluster topology and (ii) an overlay network for routing and forwarding data for application instances managed by the cluster manager. The programmatic access allows the application instances to process datacenter-aware data based on the cluster topology, while the overlay network allows the application instances to forward and route data without regard to the current cluster topology, such that the distributed application does not need to make routing and forwarding decisions.

In some embodiments, the application instances communicate with the cluster manager to access the cluster topology. The cluster manager for a particular application instance receives a query request for at least a portion of the cluster topology through a programmatic interface provided by the cluster manager. In some embodiments, the distributed cluster managers each maintain the cluster topology by communicating with other cluster managers for the cluster of application instances.

In response to the query request, the cluster manager provides the requested portion of the cluster topology to the particular application instance. The particular application instance then uses the cluster topology for processing data based on the locations of a set of application instances within the plurality of datacenters. An application instance will process data to be sent to a destination application instance differently when destination application instance is in a different datacenter. For example, when a particular application instance of some embodiments needs to communicate with a remote application instance, the particular application instance gathers a set of data from a set of other application instances within its datacenter and aggregates the data before sending the aggregated data to the destination application instance, so as to minimize the amount of cross-datacenter traffic.

The cluster managers, in some embodiments, work together to maintain an up-to-date and consistent cluster topology. In some embodiments, the cluster managers use a gossip protocol to maintain a consistent view of the cluster topology across the different datacenters. Each cluster manager periodically communicates with a group of other cluster managers (e.g., a fixed group, a randomized and/or dynamic group, etc.), to update and maintain a copy of the cluster topology at each cluster manager.

In addition, the cluster managers of some embodiments provide the ability to process data messages through an overlay network for the cluster of application instances operating on machines located across several datacenters. When the cluster manager receives a data message from a first application instance (operating on the same machine as the cluster manager) and destined for a second application instance in its cluster, the cluster manager determines whether the destination application instance is located in the same or a different datacenter. When the second application instance operates on a second machine in a different, second datacenter, the cluster manager encapsulates the data message according to an overlay network defined for the cluster of application instances, and forwards the encapsulated data message to a publicly accessible machine of the second datacenter (which may not be the same machine as the machine on which the destination application instance operates). However, when the second application operates on a machine in the same datacenter as the first machine, the method does not encapsulate the data message, but merely forwards the data message to the destination machine.

When a new application instance is to be added to a cluster, its cluster manager (i.e., the cluster manager on the machine on which the application instance operates) identifies a seed cluster manager that manages an application instance that is already a member of the cluster. The cluster manager for the new instance sends a request to be added to the cluster to the seed cluster manager. The request includes information about the new application instance (e.g., address, location, etc.) to be added to the cluster topology.

In some embodiments, the distributed cluster manager adds the new application instance to the cluster topology, and constructs efficient tunnels between application instances through a pluggable interface (UDP tunnels, SSH tunnels, VXLAN, STT, etc.). Each application instance is given a unique IP within the overlay network. Traffic within a single datacenter bypasses the overlay network and proceeds with no performance penalty. Traffic destined for a remote application instance (e.g., an application instance in a remote datacenter) is routed to an access point within the remote application instance's datacenter and then relayed to the target application instance. Distributed applications running within the overlay network use overlay IPs for addressing and can trust that their communications will be routed accordingly.

The seed cluster manager distributes a copy of the cluster topology to the cluster manager of the new instance. In some embodiments, the seed cluster manager also distributes the copy of the updated cluster topology to other cluster managers for application instances in the cluster (e.g., using a gossip protocol). The cluster manager for the new instance then processes data for the new application instance based on the received overlay network (e.g., encapsulating data messages sent by the new application instance as described above).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawings.

BRIEF DESCRIPTION OF THE DRAWINGS

The novel features of the invention are set forth in the appended claims. However, for purposes of explanation, several embodiments of the invention are set forth in the following figures.

FIGS. 6A-B illustrate an example of the distribution of a cluster topology to cluster managers for a cluster of application instances using a gossip protocol.

DETAILED DESCRIPTION

Figure 1:
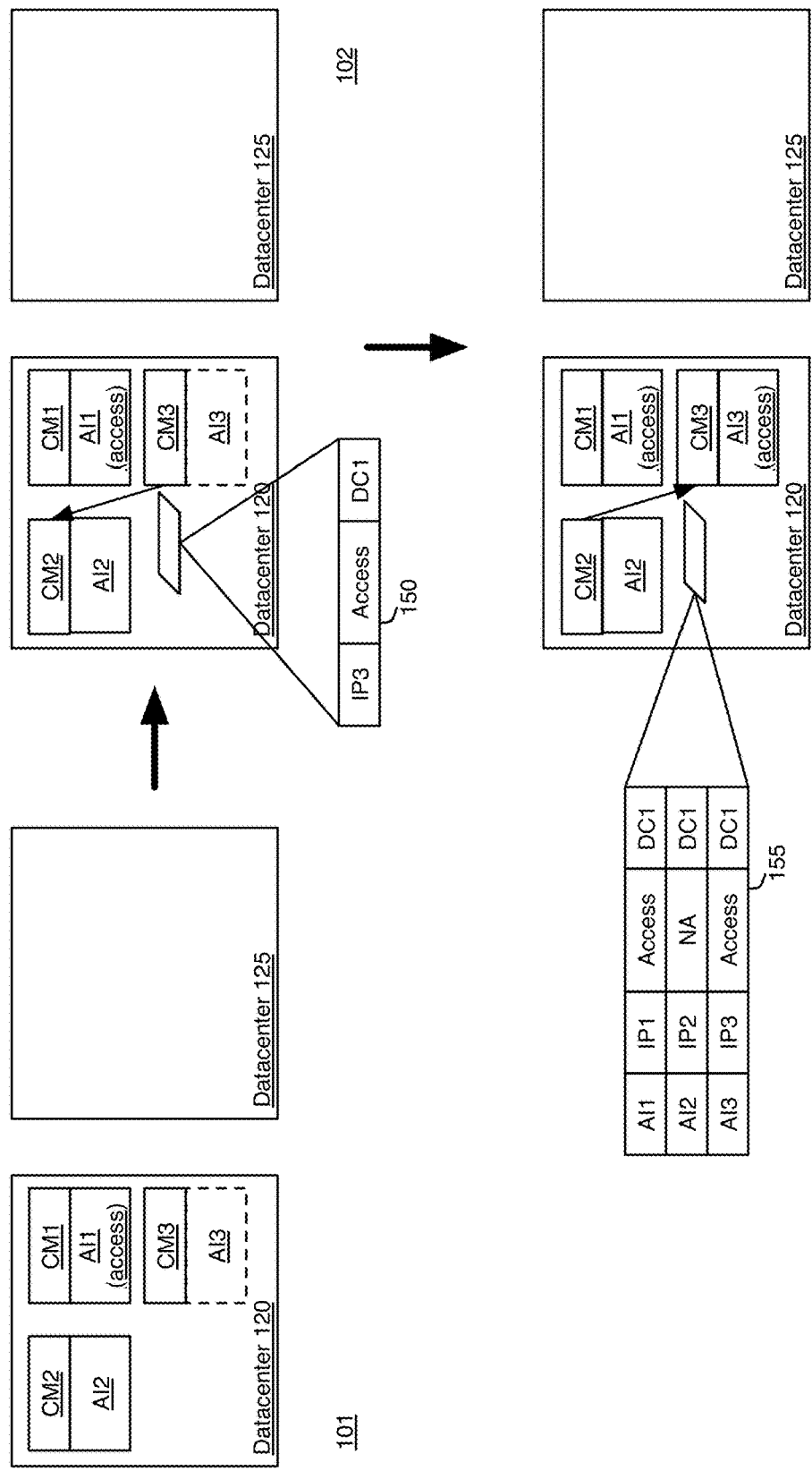
FIG. 1 illustrates an example of adding a new application instance within a datacenter to a cluster.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a cluster manager that operates on machines in a network to create a self-managing overlay network that provides both cluster membership and topology, as well as routing. The overlay network allows distributed applications to replicate data and segregate functionality based on application instance location without needing to directly manage the cluster topology. The overlay network also allows cross-datacenter communication to be sent in a way that appears direct regardless of the underlying configuration. In some embodiments, the cross-datacenter communication refers to various types of data messages that are sent across a cluster of application instances. An overlay network, in some embodiments, is a network that is decoupled from the underlying physical topology (e.g., a software-defined overlay network). The overlay network created by the cluster manager of some embodiments, for example, connects application instances located in several different datacenters.

The data transfer requirements for a distributed application fall into two basic categories, datacenter aware and simple. Datacenter aware requirements require the application instances to identify application instances within the local datacenter and to identify remote application instances so that different routing rules can be applied depending on the source and destination. Simple data requirements do not require any datacenter awareness at all. Things like access control, statistics, and configuration may be safe and lightweight enough replicate across the entire cluster without any specialized handling. Simple requirements only require that the data be transferred between any two application instances, but have no strong performance requirements (e.g., latency, routing, etc.).

The self-managing overlay network provides an application-level solution to the problem of inter-datacenter networking for a cluster of application instances. In some embodiments, the self-managing overlay network is a "datacenter aware" system that provides a programmatic interface for applications, in order to extend the capabilities of applications without requiring customers to develop and maintain elaborate network configurations and without compromising application features. Many components can be expanded to communicate across datacenters with minimal effort, and engineers are shielded from the distraction of the underlying cluster topology while still allowing low level access as necessary.

Some embodiments provide a method for providing access to a cluster topology for a cluster of application instances operating across several datacenters. The method of some embodiments provides a distributed cluster manager that tracks application instances in the cluster, tracking to which datacenter each application instance belongs. The distributed cluster manager of some embodiments also supports marking certain application instances (or the machines on which they operate) as access points to a cluster—these are the subset of application instances in each datacenter visible from one or more other datacenters or from the public Internet.

The cluster manager, or overlay daemon, of some embodiments provides both (i) programmatic access to the cluster topology and (ii) an overlay network for routing and forwarding data for application instances managed by the cluster manager. The programmatic access allows the application instances to process datacenter-aware data based on the cluster topology, while the overlay network allows the application instances to forward and route data without regard to the current cluster topology, such that the distributed application does not need to make routing and forwarding decisions.

In some embodiments, the application instances communicate with the cluster manager to access the cluster topology. The cluster manager for a particular application instance receives a query request for at least a portion of the cluster topology through a programmatic interface provided by the cluster manager. In some embodiments, the distributed cluster managers each maintain the cluster topology by communicating with other cluster managers for the cluster of application instances.

In response to the query request, the cluster manager provides the requested portion of the cluster topology to the particular application instance. The particular application instance then uses the cluster topology for processing data based on the locations of a set of application instances within the plurality of datacenters. An application instance will process data to be sent to a destination application instance differently when destination application instance is in a different datacenter. For example, when a particular application instance of some embodiments needs to communicate with a remote application instance, the particular application instance gathers a set of data from a set of other application instances within its datacenter and aggregates the data before sending the aggregated data to the destination application instance, so as to minimize the amount of cross-datacenter traffic.

The cluster managers, in some embodiments, work together to maintain an up-to-date and consistent cluster topology. In some embodiments, the cluster managers use a gossip protocol to maintain a consistent view of the cluster topology across the different datacenters. Each cluster manager periodically communicates with a group of other cluster managers (e.g., a fixed group, a randomized and/or dynamic group, etc.), to update and maintain a copy of the cluster topology at each cluster manager.

In addition, the cluster managers of some embodiments provide the ability to process data messages through an overlay network for the cluster of application instances operating on machines located across several datacenters. When the cluster manager receives a data message from a first application instance (operating on the same machine as the cluster manager) and destined for a second application instance in its cluster, the cluster manager determines whether the destination application instance is located in the same or a different datacenter. When the second application instance operates on a second machine in a different, second datacenter, the cluster manager encapsulates the data message according to an overlay network defined for the cluster of application instances, and forwards the encapsulated data message to a publicly accessible machine of the second datacenter (which may not be the same machine as the machine on which the destination application instance operates). However, when the second application operates on a machine in the same datacenter as the first machine, the method does not encapsulate the data message, but merely forwards the data message to the destination machine. In this application, reference is made to data messages and/or packets, but it should be understood that these terms, as used herein, may refer to various formatted collections of bits that may be sent across a network, such as Ethernet frames, IP packets, TCP segments, UDP datagrams, etc.

When a new application instance is to be added to a cluster, its cluster manager (i.e., the cluster manager on the machine on which the application instance operates) identifies a seed cluster manager that manages an application instance that is already a member of the cluster. The cluster manager for the new instance sends a request to be added to the cluster to the seed cluster manager. The request includes information about the new application instance (e.g., address, location, etc.) to be added to the cluster topology.

In some embodiments, the distributed cluster manager adds the new application instance to the cluster topology, and constructs efficient tunnels between application instances through a pluggable interface (UDP tunnels, SSH tunnels, VXLAN, STT, etc.). Each application instance is given a unique IP within the overlay network. Traffic within a single datacenter bypasses the overlay network and proceeds with no performance penalty. Traffic destined for a remote application instance (e.g., an application instance in a remote datacenter) is routed to an access point within the remote application instance's datacenter and then relayed to the target application instance. Distributed applications running within the overlay network use overlay IPs for addressing and can trust that their communications will be routed accordingly.

The seed cluster manager distributes a copy of the cluster topology to the cluster manager of the new instance. In some embodiments, the seed cluster manager also distributes the copy of the updated cluster topology to other cluster managers for application instances in the cluster (e.g., using a gossip protocol). The cluster manager for the new instance then processes data for the new application instance based on the received overlay network (e.g., encapsulating data messages sent by the new application instance as described above).

The above description introduces a self-managing overlay network. Several more detailed embodiments are described below. Section I describes examples of building up a self-managing overlay network. Section II describes the use and distribution of a cluster topology for a cluster of application instances. Section III describes the use of the overlay network to forward and route data between application instances of the cluster. Finally, Section IV describes an electronic system with which some embodiments of the invention are implemented.

I. Cluster Set-Up

As mentioned, when a new application instance is to be added to a cluster, its cluster manager (i.e., the cluster manager on the machine on which the application instance operates) identifies a seed cluster manager that manages an application instance that is already a member of the cluster. The cluster manager for the new instance sends a request to be added to the cluster to the seed cluster manager. The request includes information about the new application instance (e.g., address, location, etc.) to be added to the cluster topology.

In some embodiments, the distributed cluster manager adds the new application instance to the cluster topology, and constructs efficient tunnels between application instances. The seed cluster manager also distributes a copy of the cluster topology to the cluster manager of the new instance. In some embodiments, the seed cluster manager also distributes the copy of the updated cluster topology to other cluster managers for application instances in the cluster (e.g., using a gossip protocol). The cluster manager for the new instance then processes data for the new application instance based on the received overlay network (e.g., encapsulating data messages sent by the new application instance as described above).

FIG. 1 illustrates an example of adding a new application instance within a datacenter to a cluster in three stages 101-103. This figure shows two datacenters 120 and 125, which are connected by a network (not shown) such as the public Internet, a private network, etc. The different datacenters of some embodiments include multiple datacenters owned and/or operated by a particular entity (e.g., remote datacenters for a corporate enterprise network, etc.). In some embodiments, the datacenters are operated by various unrelated entities (e.g., cloud hosting datacenters operated by various vendors, enterprise network datacenters, etc.). Although only two datacenters are shown in the examples of the figures of this application, it should be evident to one skilled in the art that the methods and systems are applicable to any number of different datacenters.

The first stage 101 shows three application instances AI1-AI3 with corresponding cluster managers CM1-CM3 operating at datacenter 120. AI1 and AI2 are shown as being a part of a cluster of application instances, as indicated by the solid lines. Application instance AI3 is not yet a part of the cluster, as indicated by the dashed line.

A cluster is a related group of application instances of a distributed application, that operate together to perform the functions of the distributed application. In some embodiments, the cluster includes application instances of different types. For example, the cluster of some embodiments includes multiple different distributed applications that operate together (e.g., sharing and replicating data, distributed processing, etc.). In some embodiments, all of the application instances are of the same distributed application. In some embodiments, the different application instances are the same application, but divided into groups for performing different functions of the application.

In the example of FIG. 1, each application instance of the cluster of application instances operates on a same machine as a cluster manager of the plurality of cluster managers, and each cluster manager manages a single application instance on its particular machine. In some embodiments, the cluster manager is a separate service from the application instance (e.g., operating in the background of the machine as a daemon), while in other embodiments, the cluster manager is a module that operates as a part of an application instance. In some embodiments, a single cluster manager manages multiple application instances. For example, in some embodiments, each application instance operates within a container and multiple containers operate on a single machine. The single machine of some embodiments has a cluster manager that manage the multiple application instances.

Although the application instances are shown as individual elements, each application instance operates on a machine (not shown) in the datacenter 120. In some cases, each application operates on its own machine, while in other cases, multiple application instances of a cluster run on a single machine. In some embodiments, the machines on which the application instances operate are virtual machines, or containers, which provide isolated environments within which an application instance (or multiple application instances) an operate. The cluster managers may operate in the same virtual machine as the application instance in some embodiments, while in other embodiments the cluster managers operate on the same physical machine as their respective application instance but outside the virtual machine or container in which the application instance operates. In some embodiments, the cluster manager operates on its own virtual machine.

In addition, application instance AI1 is shown to be an access point for the datacenter 120. An access point for a datacenter provides a publicly accessible address (e.g., a Uniform Resource Locator (URL), a public IP address, etc.), which can be accessed by machines in other datacenters and networks. The access point may refer to the machine itself, or to a cluster manager or application instance that operates on the machine. Non-access points in a datacenter may not be reached directly from outside of the datacenter.

In the second stage 102, the cluster manager CM3 for the application instance AI3 sends a cluster joining request to CM2. In this example, the cluster manager CM2 for application instance AI2 is a seed cluster manager. A seed cluster manager, in some embodiments, is a cluster manager specifically made available for adding new application instances to a cluster. In some embodiments, all of the cluster managers have the ability to act as a seed cluster manager, and the configuration for a new application instance identifies the seed cluster manager that will be used.

In some embodiments, the cluster manager for application instance AI3 identifies the seed CM as an address (e.g., for the application instance AI2) stored in the configuration data for its local application instance AI3. The configuration (e.g., a user configuration, an automatically generated configuration, etc.) for a new application instance may include a single seed cluster manager (or application instance address) or more than one seed cluster manager in some embodiments. For instance, the configuration might include several seed cluster managers in the same datacenter as the new application instance, or one or more cluster managers located in another datacenter.

The request 150 includes information from the requesting application instance AI3 to join a cluster of application instances. The request 150 of some embodiments includes an address (IP3), the application instance's availability as an access point (Access), and the datacenter (DC1) in which the application instance is located. In other embodiments, the request may include additional fields, such as for authentication, role assignment, etc. In some embodiments, the address stored in the request is a desired address in the overlay network. Alternatively, or conjunctively, the request stores a local address for the new application instance, assigned for the application instance within the datacenter. In some embodiments, when the application instance is an access point, the request also includes a publicly accessible address (e.g., a URL) for the application instance. The address of the application, in some embodiments, is an address of the machine (e.g., the virtual machine or physical machine) on which the application instance operates.

In some embodiments, the request 150 is sent to the seed cluster manager CM2 as a control message, to distinguish the request from other traffic received by the cluster manager. The request 150 of some embodiments is identified as a control message when an address of the data message includes an address that is invalid for a particular data message protocol (e.g., TCP, UDP).

The third stage 103 shows that application instance AI2 responds to the request 150 with a response 155. The response 155 of some embodiments includes the cluster topology for the cluster of application instances. The cluster topology in the response 155 has been updated by application instance AI2 to include the new application instance AI3, indicating application instance AI3's address, accessibility, and datacenter location. In some embodiments, the seed cluster manager for AI2 also sets up tunnels for the new application instance AI3 to be used for an overlay network that is set up for the cluster of application instances. In other embodiments, the cluster manager CM3 sets up its tunnels based on the cluster topology information, which includes the network addresses for the various other application instances in the cluster.

In the example of FIG. 1, a new application instance joined a cluster of application instances from within the same datacenter. As a cluster grows and expands to additional datacenters, it becomes important for a new application instance to be able to join the cluster from outside of a datacenter. When external application instances (e.g., application instances running in other datacenters or networks) need to be added to a network cluster, the cluster manager of the external application instance can communicate with a cluster manager at an access point (i.e., a cluster manager with a publicly accessible address). In some embodiments, the cluster manager at the access point is used as a seed cluster manager for the new application instance.

Figure 2:
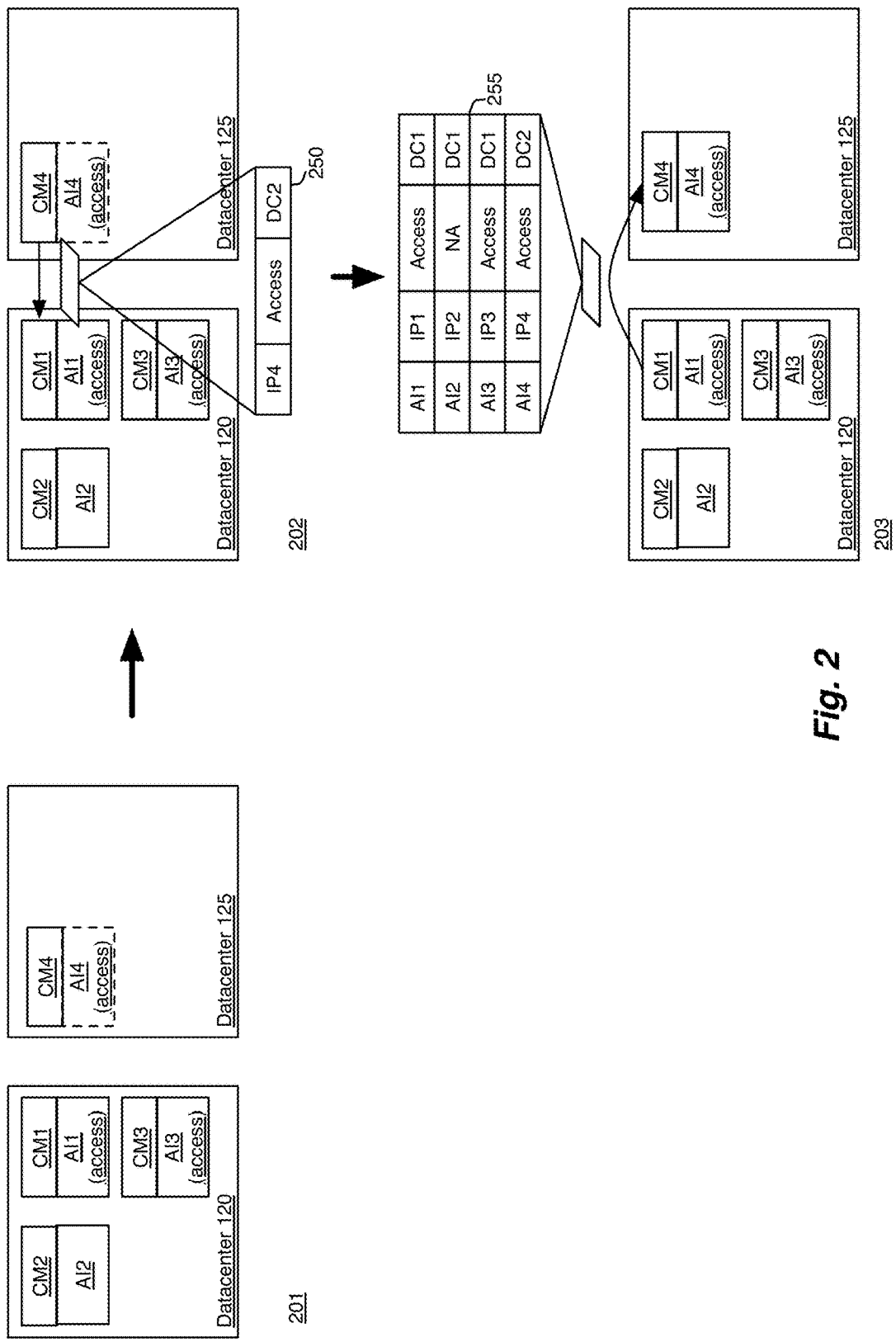
FIG. 2 illustrates an example of adding a new application instance from the second datacenter to the cluster.

FIG. 2 illustrates an example of adding a new application instance from the second datacenter 125 to the cluster in three stages 201-203. The first stage 201 shows the same datacenters 120 and 125 with application instances AI1-AI3, as at this point AI3 has successfully joined the cluster. In addition, the first stage 201 shows a new application instance AI4, located in datacenter 125 (shown as dashed because this application instance has not yet joined the cluster). As no other application instances of the cluster are currently operating in datacenter 125, the cluster manager CM4 for application instance AI4 must communicate with a cluster manager from datacenter 120 in order to join the cluster. Because the application instance AI4 operates outside of datacenter 120, some embodiments require that its specified seed cluster manager be one of the cluster managers operating as an access point within the datacenter 120. The access points (e.g., AI3 and AI1) for a cluster within a particular datacenter allow application instances that operate outside of the particular datacenter to communicate with the application instances within the particular datacenter, without forcing all of the application instances and the machines on which they operate to be publicly accessible. In this case, the seed cluster manager specified by the configuration for AI4 is the cluster manager CM1.

The second stage 202 shows that the cluster manager CM4 for the application instance AI4 sends a request 250 to the seed cluster manager CM1. The request 250 includes the address (IP4), access status (Access), and DC location (DC2) for the new application instance AI4. While in this example, the access point cluster manager is also the seed cluster manager specified by the configuration for application instance AI4, in some embodiments the seed cluster manager for a new application instance may be located in another datacenter but also is not an access point. In such cases, the cluster manager for the new application instance sends its request to the access point for the datacenter of the seed cluster manager, which forwards the request to the seed cluster manager. In other embodiments, the seed cluster manager for a new application instance is required to be either in the same datacenter as the new application instance or located at an access point.

Finally, in the third stage 203, the seed cluster manager CM1 responds to the request 250 with a response 255. The response 255 includes the updated cluster topology, which has been updated to include the new application instance AI4. This cluster topology, in some embodiments, specifies for each application instance in the cluster, the network (IP) address, the datacenter in which the application instance operates, and whether or not the application instance operates on an access node for the cluster. The third stage 203 also shows that application instance AI3 has also been designated as an access point for the cluster.

Figure 3:
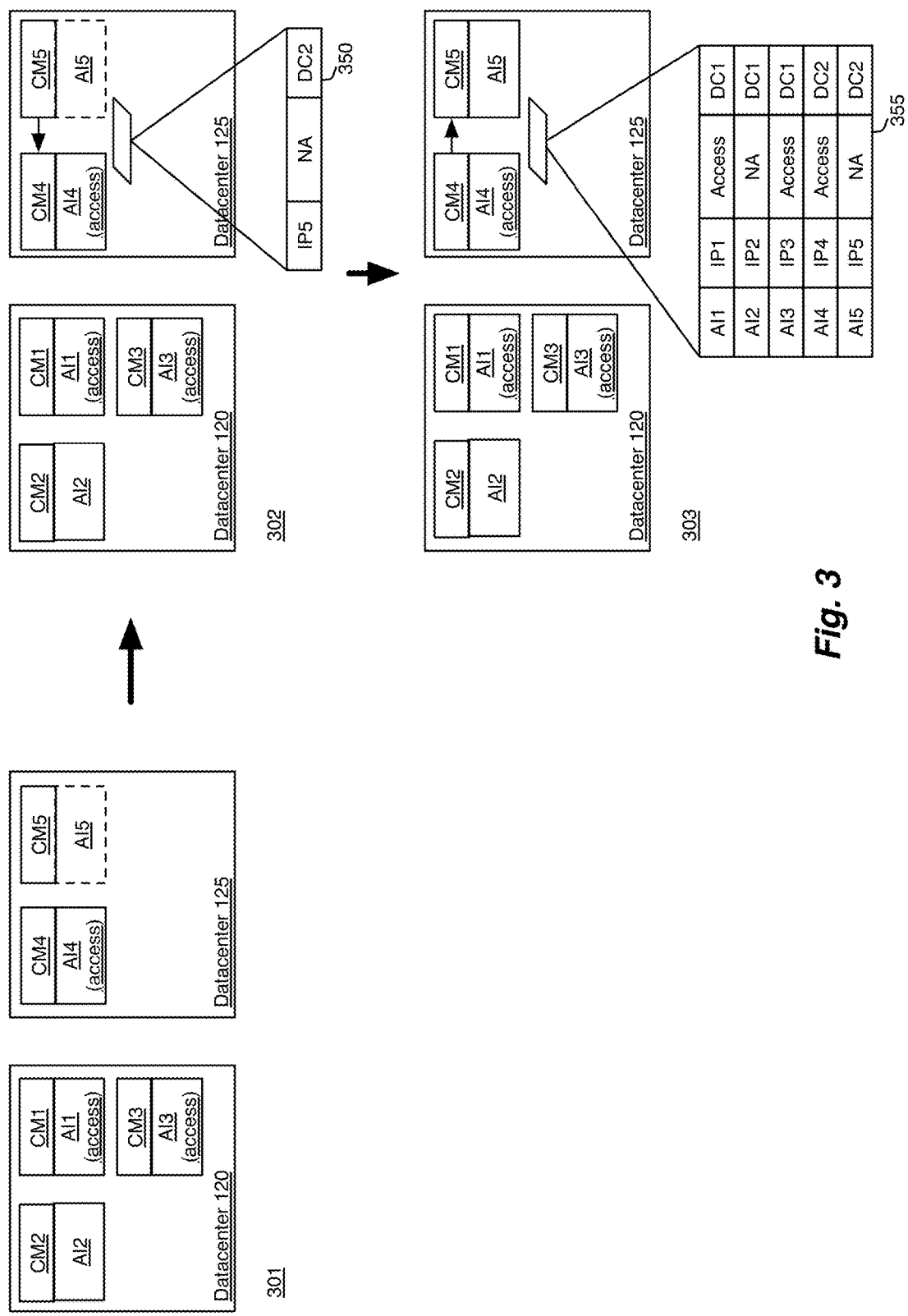
FIG. 3 illustrates an example of adding another second new application instance at the second datacenter to the cluster.

FIG. 3 illustrates an example of adding another new application instance at the second datacenter to the same cluster in three stages 301-303. In this example, a second application instance AI5 at datacenter 125 is to be added to the cluster of application instances. As in the examples above, the first stage 301 shows the datacenters 120 and 125, with cluster application instances AI1-AI4. A new application instance AI5 to be added to the cluster is shown at datacenter 125, as indicated by the dashed lines.

The second stage 302 shows that the cluster manager CM5 for the new application instance AI5 sends a request 350 to its seed cluster manager CM4, which is located in the same datacenter. The request indicates that the new application instance AI5 has an address (IP5), is not publicly accessible (NA), and is located in datacenter 125 (DC2). In the third stage 303, application instance AI4 sends back a response 355 with an updated cluster topology, including the addresses, access statuses, and datacenter locations for each application instance AI1-AI5. The third stage 303 also shows that application instance AI5 has been added to the cluster.

As the application instances and cluster managers may operate on virtual machines, these virtual machines (and thus the application instance) may migrate within a datacenter (or in rare cases, from one datacenter to another). When a VM migrates within a datacenter, assuming it retains its existing network addresses, the cluster topology is not affected. If a VM migrates to a different datacenter or changes its network address, then some embodiments require the application instance to be removed from the cluster and rejoin.

Figure 4:
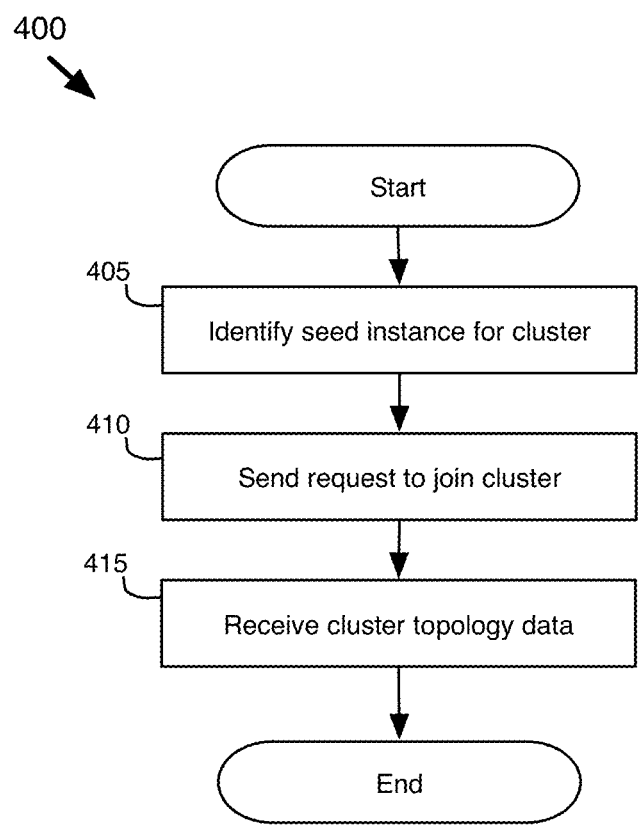
FIG. 4 conceptually illustrates a process of some embodiments for joining a cluster.

FIG. 4 conceptually illustrates a process 400 of some embodiments for joining a cluster (i.e., for adding a local application instance to a cluster). The process 400 is performed in some embodiments by a cluster manager for a new application instance that starts up on a machine on which the cluster manager runs, using configuration data provided with the new application instance.

As shown, the process 400 identifies (at 405) a seed instance for the cluster. In some embodiments, the cluster manager identifies the seed instance based on the configuration (e.g., a user configuration, an auto-generated configuration, etc.) for the new application instance. In some embodiments, the configuration for a new application instance is required to specify at least one seed instance. This may be a seed cluster manager, or a seed address (e.g., IP address) used by an application instance (to which a seed cluster manager corresponds).

Once the seed instance has been identified, the process 400 sends a request to join the cluster to the identified seed instance. The request provides information about the new application instance to the seed cluster manager. In some embodiments, the request includes a set of addresses for the new application instance (e.g., an overlay network address, a local address within the datacenter, etc.), the application instance's availability as an access point (i.e., whether or not it operates as an access point for application instances outside of its datacenter), and the datacenter in which the application instance is located. In other embodiments, the request may include additional fields, such as fields for authentication, role assignment, etc., which may be used by the application instances of the cluster.

The process 400 then receives (at 415) the cluster topology for the cluster, which now includes the new application instance. The cluster topology of some embodiments identifies a datacenter for each application instance in the cluster (i.e., the datacenter in which each application instance operates). In some embodiments, the cluster topology also includes overlay network data for the cluster. The overlay network data of some embodiments describes an overlay network that connects the application instances of the cluster with each other. The cluster topology and the overlay network will be described in further detail below. In addition, as described below, the cluster topology may not be complete, if the seed cluster manager does not have the most up-to-date view of the network. However, through the gossip process described below, both of the cluster managers will quickly learn the full scope of the cluster topology.

The new cluster manager (and new application instance, via the cluster manager) is then able to use the received cluster topology to process data based on the cluster topology, while forwarding data through the overlay network without regard for the cluster topology (e.g., irrespective of the datacenter in which a destination application instance is located).

Figure 5:
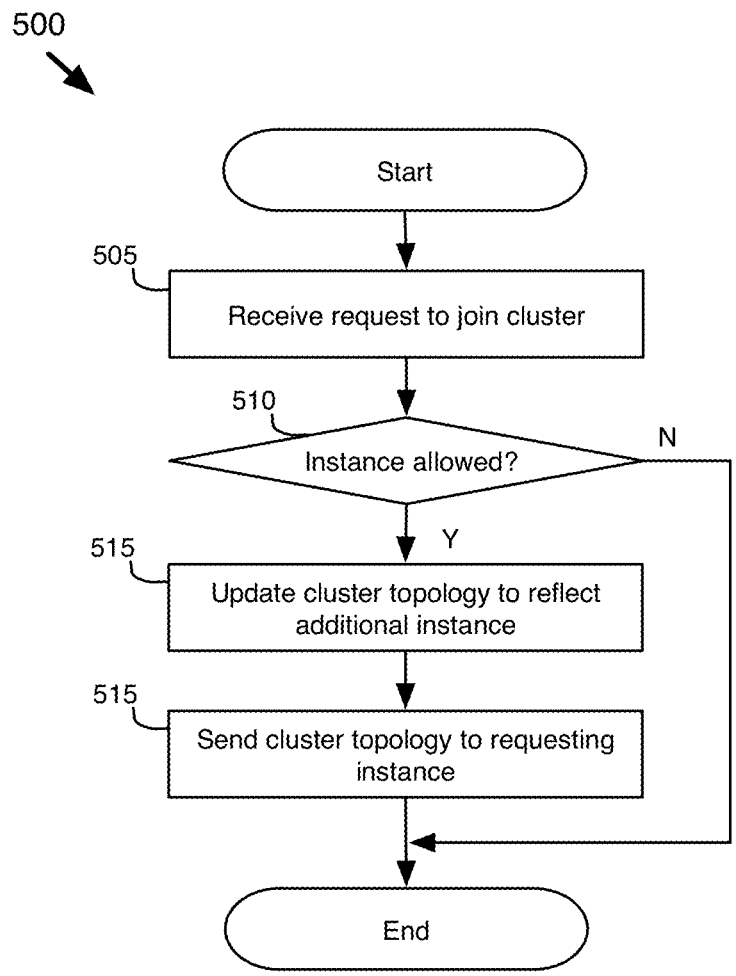
FIG. 5 conceptually illustrates a process of some embodiments for handling a request from a new application instance to join a cluster of application instances.

FIG. 5 conceptually illustrates a process 500 of some embodiments for handling a request from a new application instance (e.g., from a cluster manager for a new application instance) to join a cluster of application instances. The process 500 is performed by a cluster manager identified as a seed instance in some embodiments by the new application instance (i.e., by the configuration of the new application instance).

As shown, the process 500 receives (at 505) a request to join the cluster. In some embodiments, the request provides information about the new application instance to the cluster manager performing the process 500. In some embodiments, the request includes a set of addresses for the new application instance (e.g., an overlay network address, a local address within the datacenter, etc.), the new application instance's availability as an access point (i.e., whether or not it operates as an access point for application instances outside of its datacenter), and the datacenter in which the application instance is located. In other embodiments, the request may include additional fields, such as fields for authentication, role assignment, etc., which may be used by the application instances of the cluster.

The process 500 then determines (at 510) whether the application instance is allowed to join the cluster. In some cases, a cluster may include security or other restrictions that specify requirements for allowing access to the cluster. For example, a request to join a cluster might be required to include a correct signature (e.g., HMAC, etc.), be encrypted with a correct key, or otherwise provide proof of a cryptographic secret. If no proof (signature, encrypted message, etc.) is provided, then the request will be denied. In other cases, when there is no security, the request should always be allowed. When the new application instance is not allowed to join the cluster (e.g., because the request does not meet the security requirements for joining the cluster), the process 500 ends. Some embodiments additionally send a rejection message to the requesting cluster manager.

When the application instance is allowed to join the cluster, the process 500 updates (at 515) a cluster topology to reflect this new application instance. In some embodiments, a cluster manager for each application instance maintains the cluster topology that reflects locations (e.g., addresses and datacenter locations) for each of the application instances of the cluster. The new application instance is added to this cluster topology, using the information contained in the request (e.g., the datacenter, address, and access point status for the new application).

The process 500 then sends (at 520) the updated cluster topology to the requesting cluster manager (i.e., the cluster manager for the new application instance). This allows the requesting cluster manager to send packets for the application instance according to the overlay network defined based on the cluster topology, as well as to provide the cluster topology to the application instance as needed. The process 500 then ends.

II. Cluster Topology

The cluster topology maintained by the cluster managers enables the cluster managers to provide their respective application instances with information about the other application instances in the cluster. The application instances can then process data and communications based on the cluster topology, allowing distributed applications to optimize performance by minimizing the distribution of data across datacenters. The cluster managers of some embodiments share the cluster topology with each other and provide a query interface for the application instances.

As cluster managers for the different application instances update the cluster topology (e.g., as application instances are added and removed from the cluster), the cluster managers need to communicate and distribute the changes with each other, so that each cluster manager can maintain a current view of the cluster topology. In some embodiments, the cluster managers for the application instances of the cluster distribute the cluster topology among cluster managers operating across several datacenters.

In some embodiments, the cluster managers broadcast the cluster topology to all the other cluster managers. Alternatively, the cluster managers of some embodiments only broadcast the cluster topology to the other cluster managers within the same datacenter and to a single access point in each of the other datacenters.

In some embodiments, rather than broadcasting the cluster topology, the cluster managers use a gossip protocol to distribute the topology, reducing the amount of communications necessary to reach a consistent view of the topology across the cluster. The cluster managers periodically select one or more other cluster managers of the cluster to which to send their current view of the cluster topology. In some embodiments, the other cluster managers are selected randomly, while in other embodiments each cluster manager has a specific set of cluster managers to which it sends its view of the cluster topology. In some embodiments, each cluster manager only sends its view of the cluster topology to the other cluster managers in the same datacenter and to access points in other datacenters. In other embodiments, however, each cluster manager may send its view of the cluster topology to any cluster manager for an application instance in the cluster.

Figure 6B:
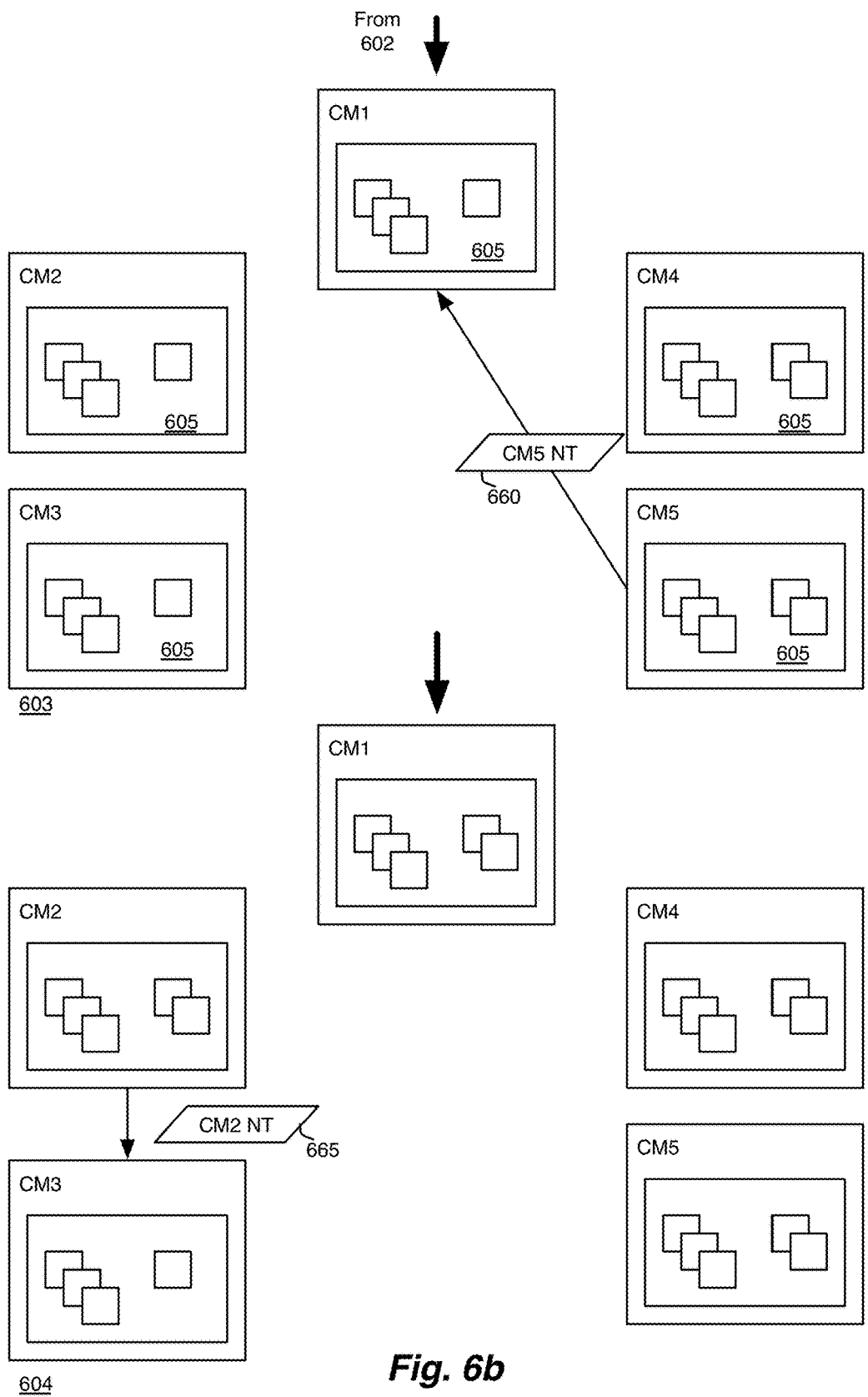

FIGS. 6A-B illustrate an example of the distribution of a cluster topology to cluster managers for a cluster of application instances using a gossip protocol in four stages 601-604. The first stage 601 shows five cluster managers CM1-CM5, that each store respective versions of the cluster topology 605. Each of the cluster managers CM1-CM5 is for managing one or more application instances (not shown) of a cluster.

This example follows from the example of FIG. 3 and shows, for each cluster manager CM1-CM5, the cluster topology maintained by each cluster manager, with application instances represented as boxes. Each group of boxes represents one of the datacenters 120 and 125. More specifically, the figure shows that cluster managers CM1-CM3 reflect outdated versions of the cluster topology 605, with three application instances (i.e., AI1-AI3) in the first datacenter, but only one application instance (i.e., AI4) in the second datacenter. As shown in FIG. 3, cluster managers CM4 and CM5 were updated with the most recent cluster topology when application instance AI5 joined the cluster through application instance AI4.

In the first stage 601, cluster manager CM4 sends a control message 650 with its cluster topology to cluster manager CM2. In some embodiments, the cluster manager CM4 sends this control message 650 with an invalid address (e.g., an address that is invalid for a particular data message protocol (e.g., TCP, UDP)) in order to identify the message as a control message, rather than a normal data message sent by an application instance that is routed between the cluster managers for the application instances. The receiving cluster manager CM2 of some embodiments parses the data message to retrieve the cluster topology.

The second stage 602 shows that CM2 has been updated with the current version of the cluster topology 605. The second stage 602 also shows that CM1 (which does not yet have the most updated cluster topology) sends a control packet 655 to CM5. In some embodiments, the cluster managers send updates at specific intervals or at random intervals. Alternatively, or conjunctively, a particular cluster manager sends the cluster topology to other cluster managers whenever the cluster topology at the particular cluster manager changes.

In the third stage 603, CM5 has not updated its cluster topology 605 with the cluster topology data received from CM1, because the version stored at CM5 is more current and complete than the one received from CM1. To determine whether a received topology is up-to-date, some embodiments use timestamps for the most recent change to their view of the topology and add these timestamps to the control message. Other embodiments use checks such as ensuring that the most recently added application instance stored in the local view of the cluster topology is in the received topology view, and rejecting the received view if this is not the case. In addition, the third stage 603 shows that CM5 sends a response packet 660 with the current cluster topology back to CM1. The cluster managers of some embodiments send such a response when an out-of-date topology view is received.

The fourth stage 604 illustrates that CM1 has been updated with the most current version of the cluster topology and that CM2, which was previously updated with the current version of the cluster topology, sends an update control message to CM3. In this way, all of the cluster managers are updated with the current cluster topology.

In addition to updating the cluster topology with new application instances and based on received cluster topology data from other cluster managers, the cluster managers of some embodiments further monitor existing application instances in order to maintain the cluster topology. In some embodiments, a cluster manager detects when an application instance that it manages is no longer available, removes the application instance from the cluster topology, and distributes the updated cluster topology without the removed application instance.

As mentioned, the application instances communicate with the cluster managers of some embodiments to access the cluster topology. The cluster manager for a particular application instance receives a query request for at least a portion of the cluster topology through a programmatic interface provided by the cluster manager. In some embodiments, the distributed cluster managers each maintain the cluster topology by communicating with other cluster managers for the cluster of application instances.

In response to the query request, the cluster manager provides the requested portion of the cluster topology to the particular application instance. The particular application instance then uses the cluster topology for processing data based on the locations of a set of application instances within the plurality of datacenters. An application instance will process data to be sent to a destination application instance differently when destination application instance is in a different datacenter. For example, when a particular application instance of some embodiments needs to communicate with a remote application instance, the particular application instance gathers a set of data from a set of other application instances within its datacenter and aggregates the data before sending the aggregated data to the destination application instance, so as to minimize the amount of cross-datacenter traffic.

Figure 7:
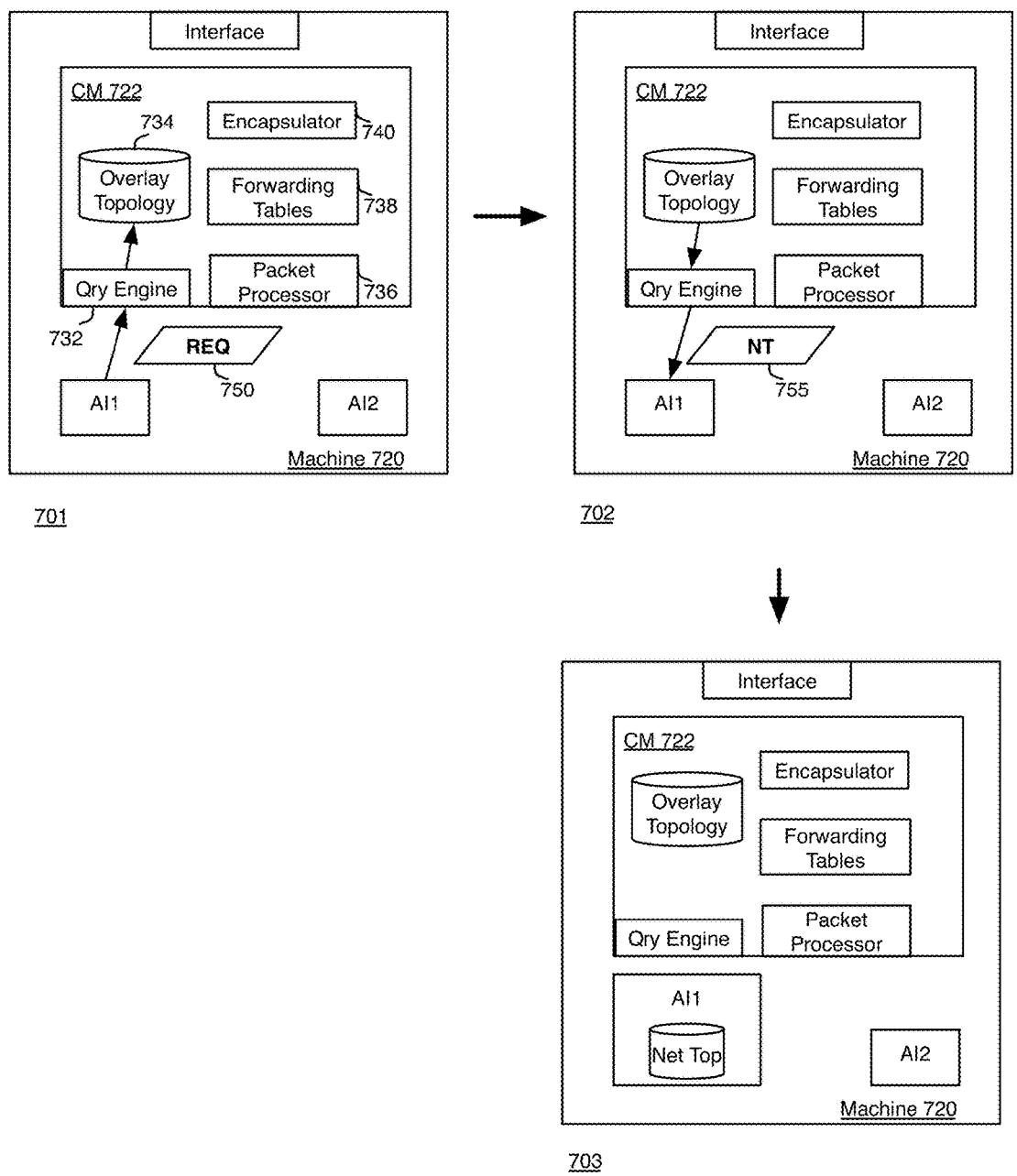
FIG. 7 illustrates an example of an application instance querying a cluster manager for a cluster topology.

FIG. 7 illustrates an example of an application instance querying a cluster manager for a cluster topology in three stages 701-703. The example of this figure shows a machine 720. The machine 720 of some embodiments is a virtual machine operating on a host machine, or could be a host machine itself (e.g., with the applications operating in containers or in separate virtual machines, and the cluster manager operating in a separate container or virtual machine or in a host operating system of the machine). The machine 720 includes a cluster manager 722, an interface 724 for communicating with the network (not shown), and application instances AI1 and AI2, which operate on the machine 720. The cluster manager 722 includes a query engine 732, a storage 734, a packet processor 736, forwarding tables 738, and an encapsulator 790.

In this example, a single cluster manager 722 manages multiple application instances AI1 and AI2. These may be two application instances belonging to the same distributed application cluster, or two application instances of separate clusters (of the same application or of completely different applications). That is, a single cluster manager operating on a machine may manage multiple clusters in some embodiments.

The first stage 701 shows that application instance AI1 sends a query request 750 to the query engine 732. Though not shown, in some embodiments the cluster manager 722 includes a programmatic interface (e.g., an application programming interface (API)) through which the applications can query the cluster manager. Some embodiments expose various query commands that allow the application to specify the portion of the cluster topology in which they are interested (e.g., the entire topology, only the local datacenter, only a particular datacenter, etc.).

The query engine 732 queries the storage 734 for data regarding the network overlay or the cluster topology stored in the storage 734 of the cluster manager 722. The queries sent by the application instance AI1 of some embodiments may include requests for a datacenter associated with a second application instance, for a complete list of the application instances of the cluster and their associated datacenters, and/or for a list of application instances in a particular datacenter.

In the second stage 702, the application instance AI1 receives a response 755 from the query engine 732 of the cluster manager 722, containing the requested portion of the cluster topology. The third stage 703 shows that application instance AI1 stores the received cluster topology in a local storage of the application instance AI1. The application instance AI1 uses the cluster topology, which provides location data (e.g., addresses and datacenter locations), in order to intelligently process data between the different datacenters. In this example, the application instance AI1 retrieves the cluster topology and stores it for later use, but in some embodiments, the application instance AI1 communicates through a programmatic interface with the query engine 732 of the cluster manager 722 on an as-needed basis. The programmatic interface provides a standardized interface for developers to use to access the cluster topology and to forward data using an overlay network.

Figure 8:
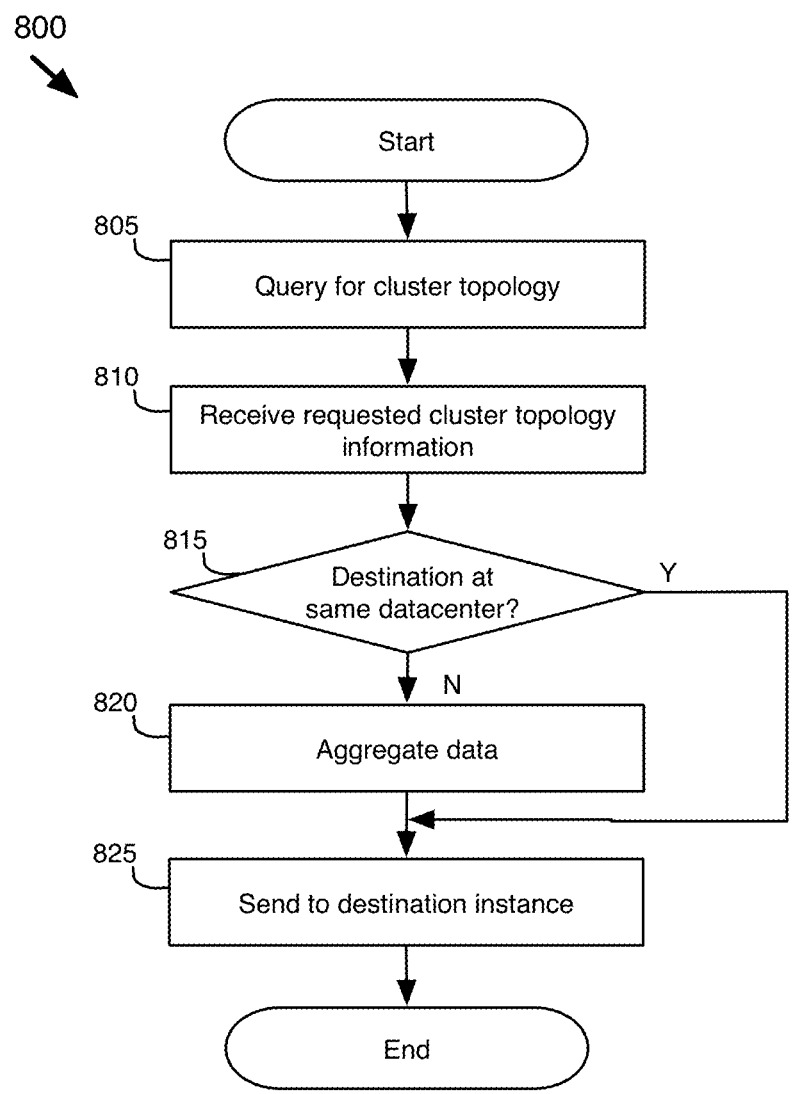
FIG. 8 conceptually illustrates a process of some embodiments for processing data according to a cluster topology.

FIG. 8 conceptually illustrates a process 800 of some embodiments for processing data according to a cluster topology. This process 800 is performed by an application instance that queries its associated cluster manager. The process is exemplary of a variety of data-processing operations that an application instance might perform using the cluster topology information from its local cluster manager. In this example, the application instance uses the cluster topology to process data in a datacenter-aware manner, as one instance of an application that spans multiple datacenters (e.g., a machine or network logging application).

As shown, the process 800 begins by querying (at 805) the cluster manager to retrieve at least a portion of the cluster topology. As mentioned above, the application may, in some embodiments, request the entire cluster topology, the location of a particular application instance in the cluster, the list of application instances in a particular datacenter (either its local datacenter or a remote datacenter), etc. The process then receives (at 810) the requested cluster topology information from the cluster manager through the cluster manager programmatic interface.

Using the received network topology (either immediately after receiving the network topology, or a duration thereafter), the process determines (at 815) whether a destination for a particular application-related communication of data is located in the same datacenter as the application instance performing the process, or at a different datacenter. For instance, the application might only want to send one communication across datacenters, rather than having each application instance at a first datacenter send each of their data separately to a destination application instance at a second datacenter. As an example, a machine logging and analytics application might need to aggregate log data for numerous virtual machines distributed across numerous datacenters. Ideally, the amount of cross-datacenter traffic should be minimized, so one application instance in each datacenter should aggregate the data for its local datacenter, and then send the data to a destination in another datacenter.

Thus, when the process determines that the destination for the application-related data is in its own datacenter, the process forwards (at 825) the data to the destination application instance. Otherwise, if the destination is in a remote datacenter (i.e., not the same datacenter as the current application instance), then the process aggregates (at 820) the application data for the datacenter. In some embodiments, the process 800 aggregates this data by collecting query results from several other application instances operating in the same datacenter and processing the data to generate streamlined or summarized results to the destination application instance, reducing the amount of data and delay through the network. The process 800 then forwards (at 825) the aggregated data to the destination application instance. When the destination is in a different datacenter, the process 800 of some embodiments forwards the data to an access point in the other datacenter, which then forwards the aggregated data to the destination (if the destination is not at the access point).

This process assumes that the application instance performing the process 800 is an aggregation point for the distributed application within its datacenter. In other cases, the application instance forwards its application-related data to a local aggregation point application instance, at which juncture it need not communicate with the eventual destination application instance for the data.

III. Overlay Network

The cluster managers of some embodiments provide an overlay network that allows application instances to seamlessly connect as though running in a single datacenter. In some embodiments, the application instances in the cluster form a complete graph in the overlay network. In some embodiments, every application instance is connected to every other application instance through the overlay network, even when only one application instance in each datacenter is exposed publicly. The cluster managers allow the distributed application to be deployed in an otherwise unsupported configuration with no change to the core codebase. Because routing is handled within the networking stack, no application changes are required for immediate visibility of remote application instances.

The cluster managers of some embodiments only process packets for remote datacenters through the overlay network for improved performance. When the cluster manager receives a data message from a first application instance (operating on the same machine as the cluster manager) and destined for a second application instance in its cluster, the cluster manager determines whether the destination application instance is located in the same or a different datacenter. When the second application instance operates on a second machine in a different, second datacenter, the cluster manager encapsulates the data message according to an overlay network defined for the cluster of application instances, and forwards the encapsulated data message to a publicly accessible machine of the second datacenter (which may not be the same machine as the machine on which the destination application instance operates). However, when the second application operates on a machine in the same datacenter as the first machine, the method does not encapsulate the data message, but merely forwards the data message to the destination machine.

Figure 9:
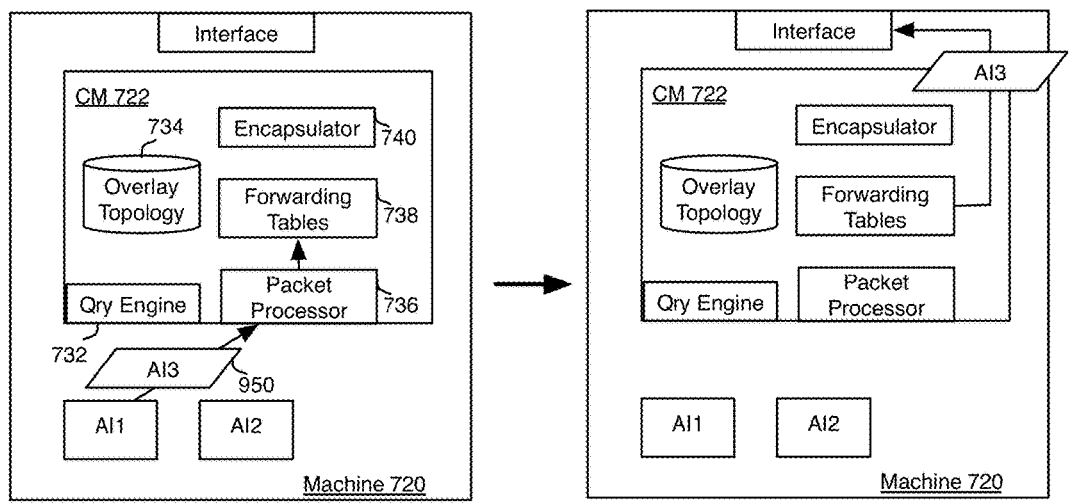
FIG. 9 illustrates an example of a cluster manager processing a data message addressed to an application instance in the same datacenter.

FIG. 9 illustrates an example of a cluster manager processing a data message addressed to an application instance in the same datacenter over two stages 901 and 902. The first stage 901 shows machine 720 as described above with reference to FIG. 7. In the first stage 901, application instance AI1 sends a data message 950 with a destination address of application instance AI3 to the packet processor 736 of the cluster manager 722. In some embodiments, the application instances direct their data messages to interface 724, but packet processor 736 intercepts all data messages coming from the distributed application instances AI1 and AI2. If AI2 was a non-distributed application, in some embodiments, the cluster manager would not intercept its data messages, instead allowing them to proceed directly to the interface.

The first stage 901 also shows that the packet processor 736 accesses a set of forwarding tables 738 to determine how to forward the data message through the network. In some embodiments, the cluster manager updates the forwarding tables 738 based on the cluster topology to encapsulate data messages destined for remote datacenters. The cluster managers of some embodiments maintain a map of shortest paths to each other member of the cluster (i.e., identifying the optimal access point in the remote datacenter for each remote application instance). In some embodiments, the cluster manager uses a first network interface for non-cluster communication and creates a second network interface for communicating through the overlay network. In some such embodiments, the network address for the second network interface is assigned based on a configuration for the application instance.

In this example, the data message 950 is destined for AI3, which operates on a different machine in the same datacenter. The second stage 902 shows that data message 950 bypasses the encapsulator 740 and is forwarded through interface 724 to AI3, based on the information in the forwarding tables 738 that specifies that AI3 is located in the same datacenter as the cluster manager 722.

In some embodiments, the encapsulator 740 is for encapsulating data for remote application instances and forwarding the data to other cluster managers of the cluster. The forwarding tables of some embodiments forward any data messages addressed to application instances in the same datacenter directly, without encapsulating the data messages. This prevents any impact to traffic for application instances in the same datacenter (i.e., it alleviates the send- and receive-side processing associated with encapsulations), as well as other traffic unrelated to the cluster.

Figure 10:
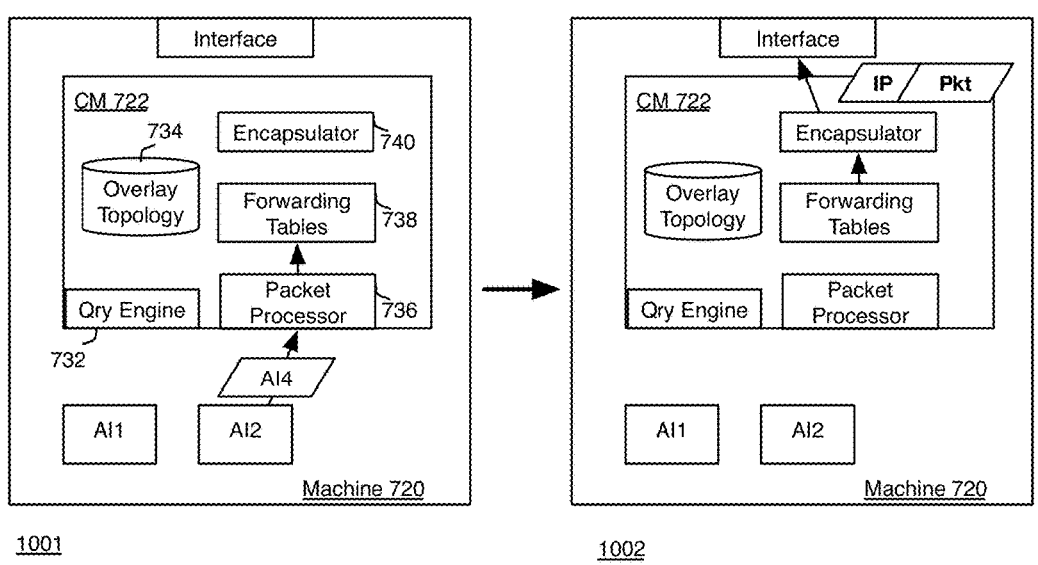
FIG. 10 illustrates an example of a cluster manager processing a data message addressed to an application instance in a different datacenter using the overlay network.

FIG. 10 illustrates an example of a cluster manager processing a data message addressed to an application instance in a different datacenter using the overlay network in two stages 1001-1002. As in the example of FIG. 9, the first stage 1001 shows that data message 1050 is processed by the forwarding tables 738 (e.g., after being intercepted by the packet processor 736). In this case, the data message is sent by AI2, rather than AI1. In some embodiments, AI2 is an application instance in the same cluster as AI1, in which case the same set of forwarding tables and overlay topology is used. However, in other embodiments, application instance A2 belongs to a completely separate application cluster, in which case the cluster manager uses a separate cluster topology and set of forwarding tables.

The second stage 1002 shows that, because the data message 1050 has a destination address for an application instance located in a remote datacenter, the encapsulator 740 encapsulates the data message 1050 with an overlay network encapsulation (including, e.g., a destination IP address used by destination in the overlay network) and sends the data message according to the forwarding tables (e.g., to an access point in the remote datacenter. The encapsulation of some embodiments is based on a tunneling protocol, such as User Datagram Protocol (UDP) tunneling, Generic Routing Encapsulation (GRE) tunneling, Virtual Extensible LAN (VXLAN) tunneling, Stateless Transport Tunneling (STT), Secure Shell (SSH) tunneling, etc.).

In some embodiments, when the machine 720 is a VM or other data compute node that operates on top of virtualization software (e.g., a hypervisor, virtual machine monitor, etc.) with a software forwarding element (e.g., a virtual switch), the data message 950 or 1050 is sent to the virtualization software forwarding element. The virtualization software forwarding element handles data messages from the machine 720 as it would with any other data messages in some embodiments, sending these data messages out onto the physical network of the datacenter.

Figure 11:
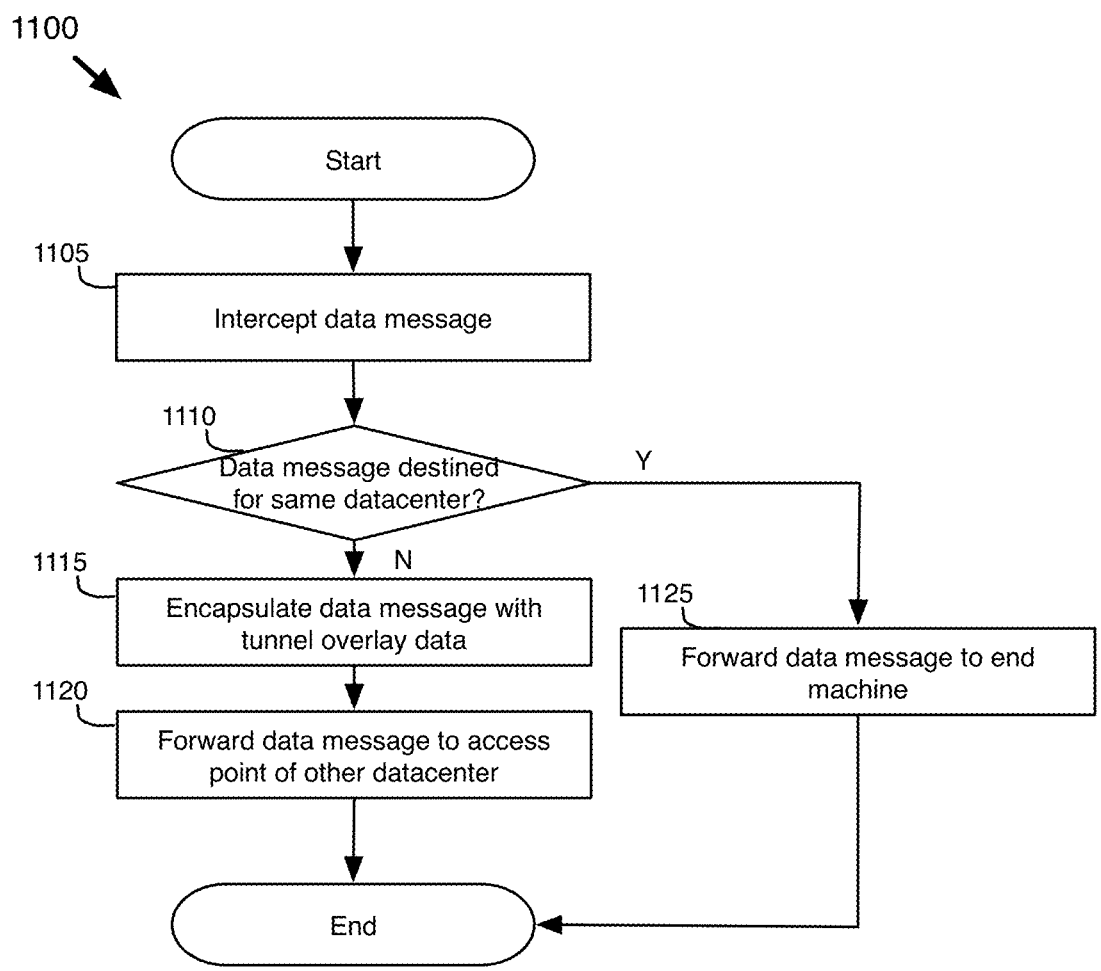
FIG. 11 conceptually illustrates a process of some embodiments for processing data messages intercepted by a cluster manager through an overlay network.

FIG. 11 conceptually illustrates a process of some embodiments for processing data messages intercepted by a cluster manager through an overlay network. The process is performed by a cluster manager that operates on a machine with an application instance belonging to a distributed application cluster in some embodiments, whenever the application instance sends a data message to another application instance in its cluster.

As shown, the process 1100 intercepts (at 1105) a data message from a source application instance located on its machine. In some embodiments, when an application instance that belongs to a cluster managed by the cluster manager sends a data message to an application instance in its cluster, the cluster manager automatically intercepts the data message. When the application instance either does not belong to a cluster, or is sending traffic outside of the cluster, the cluster manager operating on the machine does not intercept such data messages.

The process 1100 then determines (at 1110) whether the data message is addressed to an application instance in the same datacenter. As indicated, at this point the cluster manager has already determined that the data message is addressed to another application instance in the cluster (based on its decision to intercept the data message). As the cluster manager stores the network topology of the application cluster, including in which datacenter each other application instance is located, the cluster manager can easily determine whether the destination application instance is local (operating in the same datacenter) or remote (operating in a different datacenter).

When the data message is addressed to an application instance in the same datacenter, the process 1100 simply forwards (at 1125) the data message to the destination application instance without modifying the data message. In some embodiments, the machine in which the cluster manager operates simply outputs the data message according to its network stack, or sends the data message to a forwarding element (e.g., switch or router) to which it connects.

On the other hand, when the data message is addressed to an application instance in a different datacenter, the process 1100 encapsulates (at 1115) the data message with tunnel overlay data before forwarding (at 1120) the data message to an access point of the remote datacenter. The encapsulation of some embodiments is based on a tunnel protocol (e.g., User Datagram Protocol (UDP), Generic Routing Encapsulation (GRE) protocol, Virtual Extensible LAN (VXLAN) protocol, Secure Transaction Technology (STT) protocol, Secure Shell (SSH) protocol, etc.).

Figure 12:
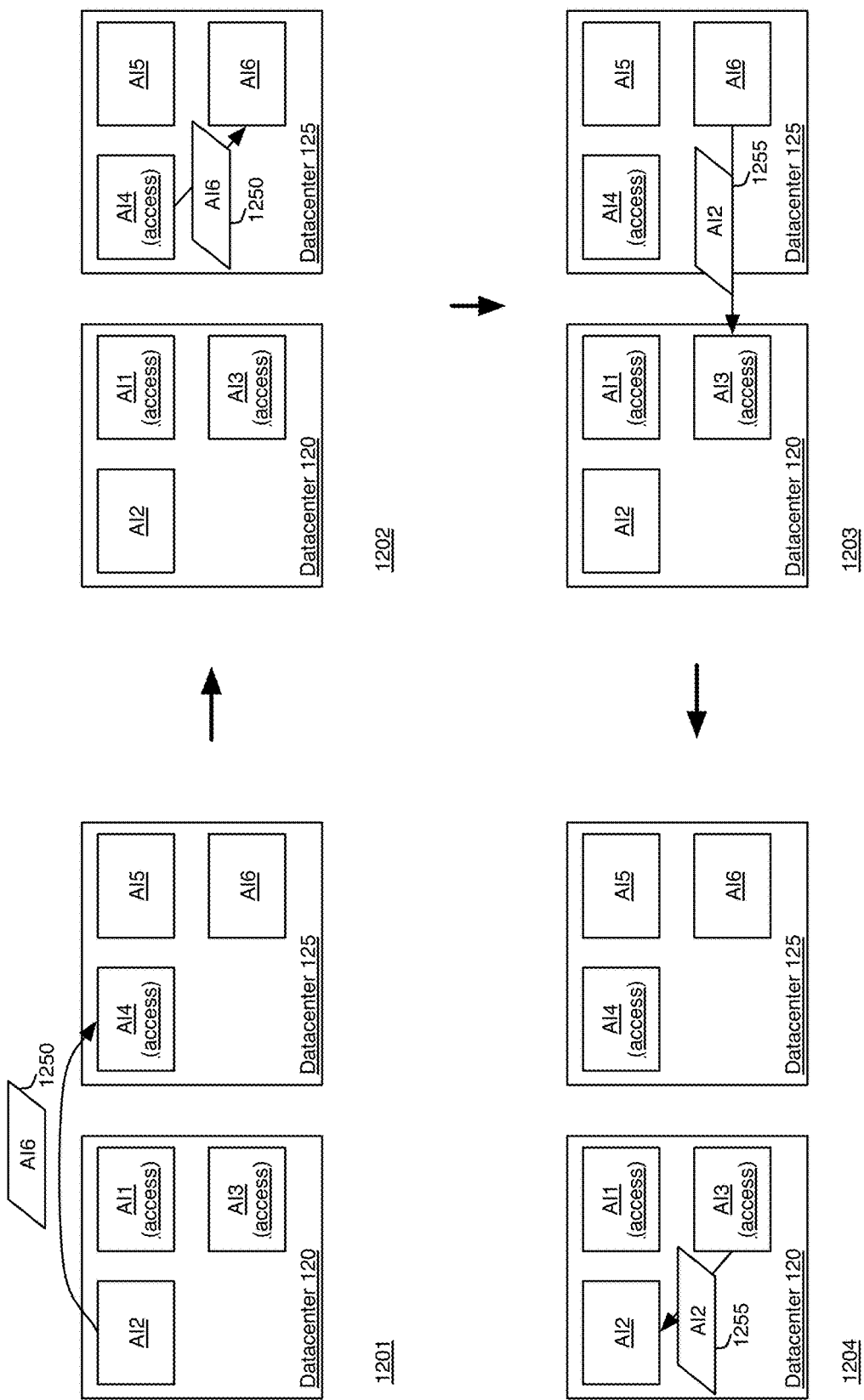
FIG. 12 illustrates an example of communications between application instances of a cluster spread across different datacenters.

As only certain application instances and their cluster managers in a particular datacenter are accessible for data messages sent from outside the datacenter (e.g., from application instances located in a different datacenter), inbound and outbound communication will frequently take different routes through the cluster. FIG. 12 illustrates an example of communications between application instances of a cluster spread across different datacenters in four stages 1201-1204. The first stage 1201 shows the datacenters 120 and 125 with application instances AI1-AI6, as shown above in FIG. 4.

The first stage 1201 shows that application instance AI2 sends data message 1250 destined for a remote application instance AI6. Most remote communication will result in one or two hops as data messages are first forwarded to an access point and then to their target application instance—unless the target is the access point.

The cluster manager (not shown) of application instance AI2 intercepts the data message 1250 and forwards the data message 1250 to an access point (i.e., the cluster manager for application instance AI4) for the cluster in datacenter 125. In some embodiments, the cluster manager of application instance AI2 selects the access point to which to forward the data message 1250 from a list of access points identified for the datacenter in the cluster topology. In some embodiments, the access point is selected randomly, but, in order to prevent negative effects from out-of-order transmission, a source application instance of some embodiments will only use one access point at any given time or for a particular group of data messages.

The second stage 1202 shows that the access point cluster manager determines that the data message is not intended for application instance AI4 and forwards the packet to the cluster manager for the destination application instance AI6. As data messages are received either from the network stack or from another cluster manager, the cluster manager determines whether the data messages are destined for the local application instance or if they require additional forwarding. In some embodiments, data messages are transmitted via UDP as it behaves similar to raw IP and avoids TCP meltdown. Data messages are only ever returned to the network stack once they reach their final destination in some embodiments.

In the third stage 1203, application instance AI6 receives the data message 1250 sends a response data message 1255 back to application instance AI2. Application instance AI6 identifies an access point for datacenter 120 at AI3 and sends the response data message 1255 to AI3. As noted above, inbound and outbound communication will frequently take different routes, because each cluster manager sends the data message to an access point in the destination datacenter. Because AI2 is not an access point, AI6 could not send the response data message back via the same path (i.e., AI4 would need to send the response data message 1255 to an access point in the first datacenter 120 anyway, so AI6 sends the data message directly to this access point). Finally, the fourth stage 1204 shows that application instance AI3 forwards the response packet to application instance AI2.

It should be noted that while the example in FIG. 12 only shows two datacenters, in some cases a cluster might be spread across numerous datacenters (e.g., 3, 4, 10, etc.). In some cases, one or more of the datacenters may not have access points exposed to all of the other datacenters (e.g., because none of the application instances in a particular datacenter operate on publicly accessible machines). For example, the application instances in a first datacenter might not be able to communicate directly with any of the application instances in a second datacenter, and vice versa. So long as an access point in a third datacenter can communicate with machines in both datacenters, the overlay network will still work. In this case, a cluster manager for an application instance in the first datacenter would forward a data message addressed to an application instance in the second datacenter to the access point in the third datacenter, which would then send the data message to an access point in the second datacenter (which subsequently sends the packet to the cluster manager for the destination application instance). The return path would again be different (assuming the source and destination application instances are not located at access points), as the cluster manager for the second datacenter application instance would send the packet to the access point in the third datacenter, which sends the packet to an access point in the first datacenter (which subsequently sends the packet to the cluster manager for the original source application instance).

Figure 13:
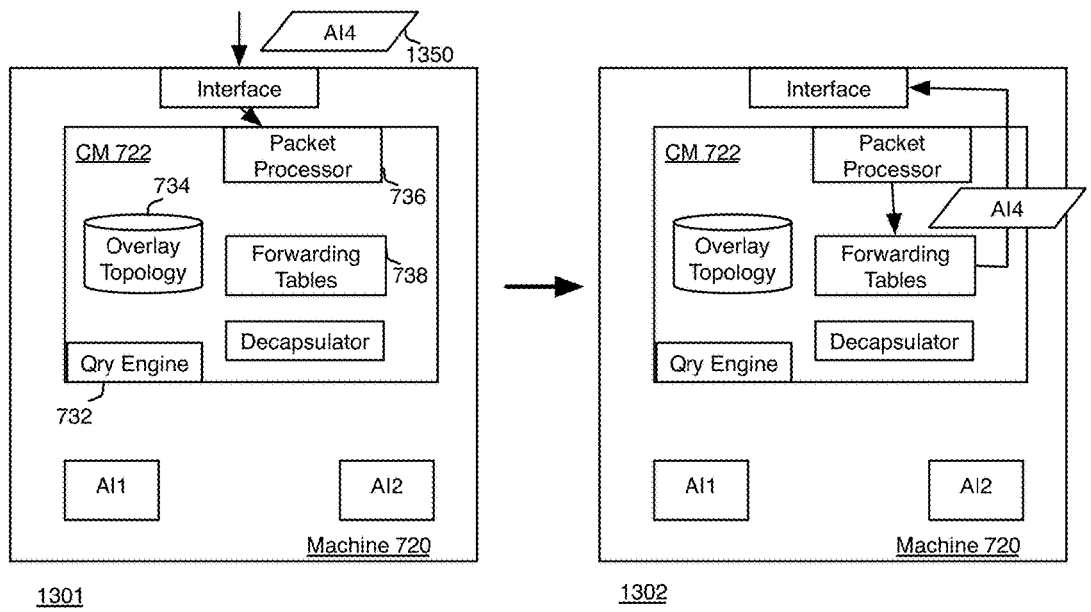
FIGS. 13 and 14 illustrate examples of processing received data messages by the cluster manager at an access point.
Figure 14:
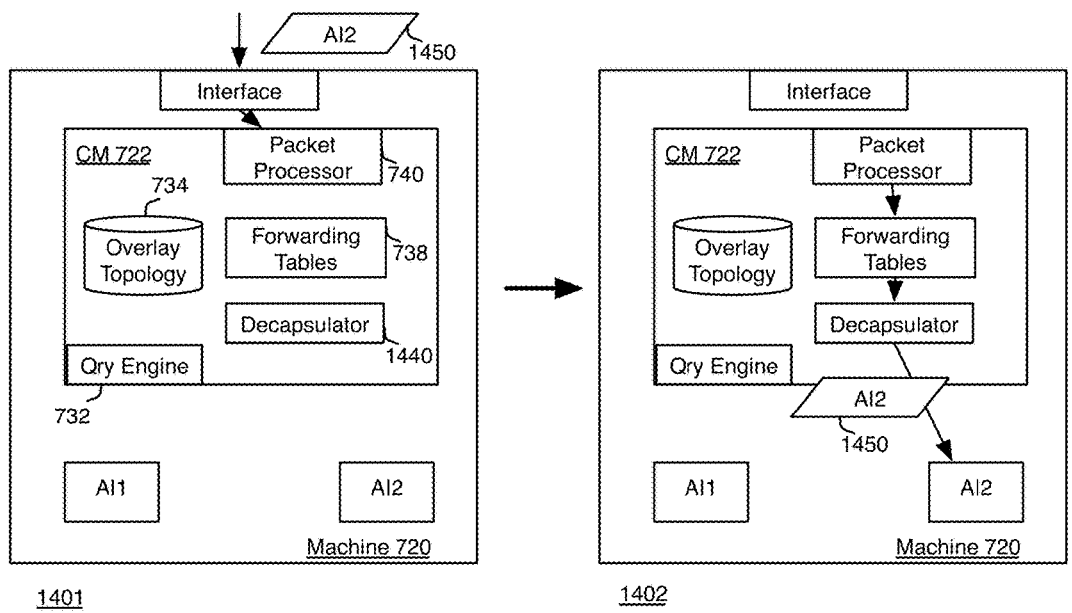

FIGS. 13 and 14 illustrate examples of processing received data messages by the cluster manager at an access point. FIG. 13 illustrates an example of an access point cluster manager processing a received data message addressed to an application instance located in the datacenter but not at the access point in two stages 1301-1302. In this example, machine 720 is a publicly accessible machine, or access point, for a datacenter. As described above, when application instances in one datacenter send messages destined for application instances in a remote datacenter, the messages are forwarded by their local cluster managers to an access point (i.e., a publicly accessible machine, cluster manager, application instance, etc.) in the remote datacenter. The first stage 1301 shows that machine 720 receives a data message 1350 at interface 724. The received data message 1350 has a destination address for the application instance AI4, which does not operate on machine 720. In some embodiments, this destination address is part of a tunnel encapsulation on the data message, added to the data message by the cluster manager at the source application instance, as shown in FIG. 10.

The second stage 1302 shows that the cluster manager uses the forwarding tables 738 to determine that the data message 1350 is not addressed to a local application instance operating on the machine 720. As such, the cluster manager 722 sends the packet back out on the interface 724 for delivery to the destination application instance through the datacenter network.

FIG. 14 illustrates an example of an access point cluster manager processing a received data message addressed to an application instance located at the access point in two stages 1401-1402. As in the above example, the machine 720 is a publicly accessible access point for the datacenter. The first stage 1401 shows that machine 720 receives a data message 1450 at interface 724. The received data message 1350 has a destination address for the application instance AI2, which operates on the access point machine 720. In some embodiments, this destination address is part of a tunnel encapsulation on the data message, added to the data message by the cluster manager at the source application instance, as shown in FIG. 10.

The second stage 1402 shows that the cluster manager uses the forwarding tables 738 to determine that the data message 1450 is addressed to a local application instance operating on the machine 720. As such, the decapsulator 1440 decapsulates the data message and delivers this data message to the destination application instance AI2 on the machine 720.

Figure 15:
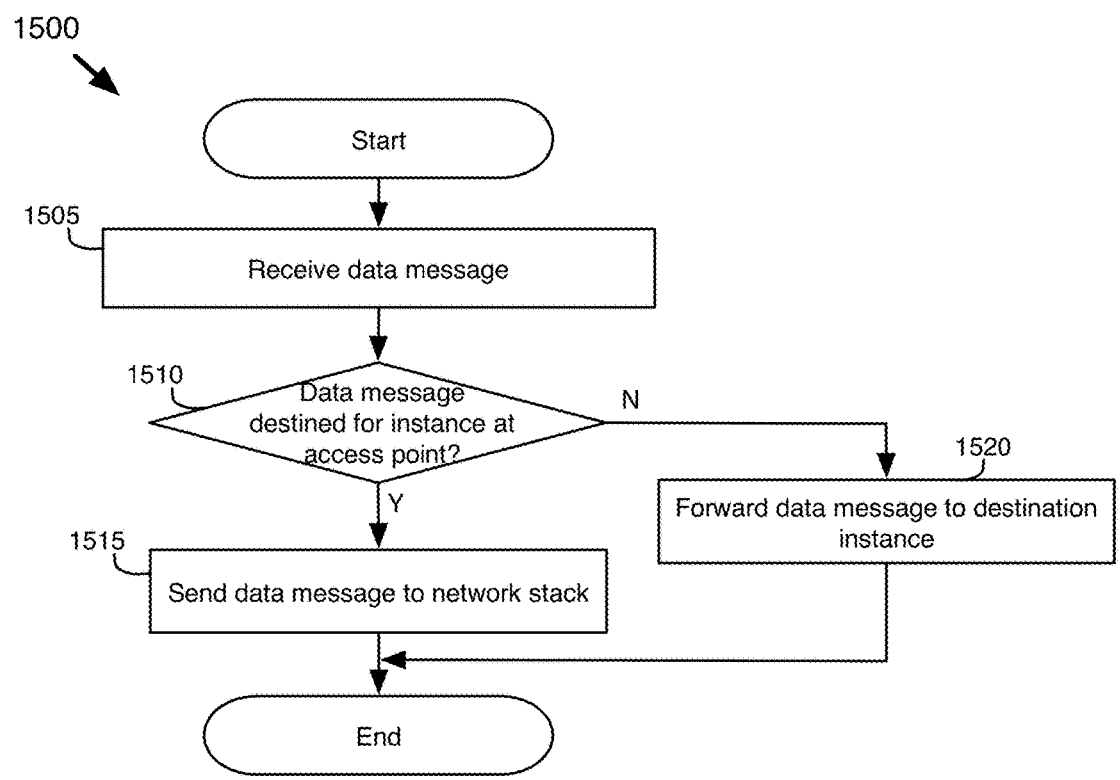
FIG. 15 conceptually illustrates a process of some embodiments for processing data messages received at an access point from outside the datacenter of the access point.

FIG. 15 conceptually illustrates a process 1500 of some embodiments for processing data messages received at an access point from outside the datacenter of the access point. In some embodiments, the process 1500 is performed by a cluster manager that operates on a machine with a publicly accessible address, and therefore serves as an access point within its datacenter for the application instances of a cluster that are located outside the datacenter.

As shown, the process 1500 begins by receiving (at 1505) a data message from a source application instance. In some embodiments, the data message is received from a remote cluster manager, that encapsulated the packet according to the overlay network and sent the packet through the network between datacenters to the access point machine. In some embodiments, all incoming traffic received through the interface of the machine is sent to the cluster manager, while in other embodiments only packets relating to the application cluster overlay are processed by the cluster manager.

The process 1500 then determines (at 1510) whether the data message is addressed to a local application instance that operates on the machine 720 along with the cluster manager. The cluster manager of some embodiments can determine this based on the cluster topology stored for the one or more clusters to which the applications it manages belong, which indicates both the address of its local application instance as well as those of the other application instances in the same datacenter.

When the data message is addressed to a local application instance (on the same machine), the process 1500 sends (at 1515) the data message to the local network stack (and also decapsulates the data message). The local network stack delivers the data message to the local application instance, which allows the local application instance to process and act on the data message.

On the other hand, when the data message is not addressed to a local application instance on the access point machine, the process 1500 forwards (at 1520) the data message to the destination instance across the local datacenter. In some embodiments, in order to forward the data messages, the process 1500 modifies a set of forwarding tables based on a relationship between overlay network addresses and a separate set of internal addresses defined in the datacenter. The process 1500 of some embodiments forwards (at 1520) internal data messages (i.e., data messages destined for application instances in the same datacenter) using the modified set of forwarding tables without encapsulating or decapsulating the data messages.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
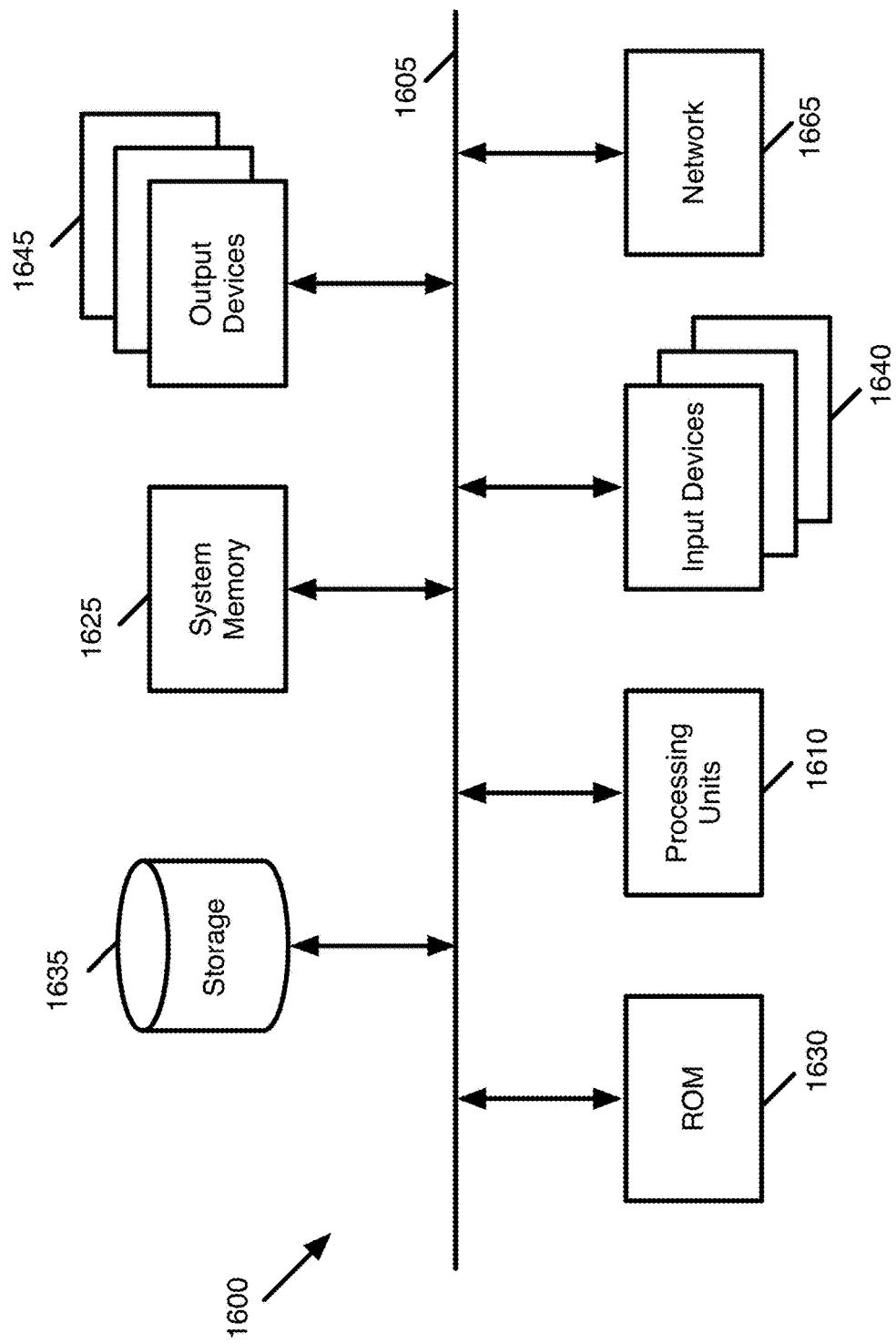
FIG. 16 conceptually illustrates a computer system with which some embodiments of the invention are implemented.

FIG. 16 conceptually illustrates a computer system 1600 with which some embodiments of the invention are implemented. The computer system 1600 can be used to implement any of the above-described hosts, controllers, and managers. As such, it can be used to execute any of the above described processes. This computer system includes various types of non-transitory machine readable media and interfaces for various other types of machine readable media. Computer system 1600 includes a bus 1605, processing unit(s) 1610, a system memory 1625, a read-only memory 1630, a permanent storage machine 1635, input machines 1640, and output machines 1645.

The bus 1605 collectively represents all system, peripheral, and chipset buses that communicatively connect the numerous internal machines of the computer system 1600. For instance, the bus 1605 communicatively connects the processing unit(s) 1610 with the read-only memory 1630, the system memory 1625, and the permanent storage machine 1635.

From these various memory units, the processing unit(s) 1610 retrieve instructions to execute and data to process in order to execute the processes of the invention. The processing unit(s) may be a single processor or a multi-core processor in different embodiments. The read-only-memory (ROM) 1630 stores static data and instructions that are needed by the processing unit(s) 1610 and other modules of the computer system. The permanent storage machine 1635, on the other hand, is a read-and-write memory machine. This machine is a non-volatile memory unit that stores instructions and data even when the computer system 1600 is off. Some embodiments of the invention use a mass-storage machine (such as a magnetic or optical disk and its corresponding disk drive) as the permanent storage machine 1635.

Other embodiments use a removable storage machine (such as a floppy disk, flash drive, etc.) as the permanent storage machine. Like the permanent storage machine 1635, the system memory 1625 is a read-and-write memory machine. However, unlike storage machine 1635, the system memory is a volatile read-and-write memory, such a random access memory. The system memory stores some of the instructions and data that the processor needs at runtime. In some embodiments, the invention's processes are stored in the system memory 1625, the permanent storage machine 1635, and/or the read-only memory 1630. From these various memory units, the processing unit(s) 1610 retrieve instructions to execute and data to process in order to execute the processes of some embodiments.

The bus 1605 also connects to the input and output machines 1640 and 1645. The input machines enable the user to communicate information and select commands to the computer system. The input machines 1640 include alphanumeric keyboards and pointing machines (also called "cursor control machines"). The output machines 1645 display images generated by the computer system. The output machines include printers and display machines, such as cathode ray tubes (CRT) or liquid crystal displays (LCD). Some embodiments include machines such as a touchscreen that function as both input and output machines.

Finally, as shown in FIG. 16, bus 1605 also couples computer system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of computer system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological machines. These terms exclude people or groups of people. For the purposes of the specification, the terms display or displaying means displaying on an electronic machine. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, this specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 4, 5, 8, 11 and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

I claim:

1. A method for allowing a first application instance operating in a first datacenter to send data to a second application instance operating in a second datacenter, the method comprising:
at a first cluster manager that manages the first application instance and operates in the first datacenter:
sending, to a second cluster manager, a request to add the first application instance to an application cluster that includes the second application instance operating in the second datacenter;
from the second cluster manager, receiving a cluster topology that identifies a plurality of application instances of the application cluster within a plurality of datacenters, wherein the plurality of application instances comprises the first and the second application instances, wherein the cluster topology comprises information for defining an overlay-network encapsulation header for sending data messages from the first application instance to the second datacenter;
receiving, from the first application instance a first data message that is for the second application instance; and
encapsulating the first data message with the overlay-network encapsulation header and sending the encapsulated first data message to the second datacenter.

2. The method of claim 1, wherein the first application instance operates on a first machine that comprises a first network interface for sending data messages that are not encapsulated with the overlay-network encapsulation header, wherein the method further comprises creating a second network interface for sending data messages encapsulated with the overlay-network encapsulation header.

3. The method of claim 2, wherein the request sent to the second cluster manager comprises an address for the first application instance that is an overlay network address assigned to the second network interface for the first application instance.

4. The method of claim 1, wherein the request comprises a datacenter identifier identifying that the first application instance operates in the first datacenter.

5. The method of claim 4, wherein the request further comprises an indication that the first application instance is an access point for the first datacenter, wherein an address assigned to the first application instance is a publicly accessible address.

6. The method of claim 1, wherein the second cluster manager operates in the second datacenter.

7. The method of claim 6, wherein sending the encapsulated first data message to the second datacenter comprises sending the first data message to the second cluster manager for the second cluster manager to forward the first data message to a third cluster manager for the second application instance.

8. The method of claim 1, wherein the first cluster manager operates on a computer along with the first application instance.

9. The method of claim 8, wherein the first application instance operates in a first container on the computer, wherein the first cluster manager manages at least a third application instance operating in a second container on the computer.

10. A non-transitory machine readable medium storing a first cluster manager for execution by at least one processing unit, the first cluster manager for allowing a first application instance operating in a first datacenter to send data to a second application instance operating in a second datacenter, the first cluster manager comprising sets of instructions for:
sending, to a second cluster manager, a request to add the first application instance to an application cluster that includes the second application instance operating in the second datacenter;
from the second cluster manager, receiving a cluster topology that identifies a plurality of application instances of the application cluster within a plurality of datacenters, wherein the plurality of application instances comprises the first and the second application instances, wherein the cluster topology comprises information for defining an overlay-network encapsulation header for sending data messages from the first application instance to the second datacenter;
receiving, from the first application instance, a first data message that is for the second application instance; and
encapsulating the first data message with the overlay-network encapsulation header and sending the encapsulated first data message to the second datacenter.

11. The non-transitory machine readable medium of claim 10, wherein the first application instance operates on a first machine that comprises a first network interface for sending data messages that are not encapsulated with the overlay-network encapsulation header, wherein the first cluster manager further comprises a set of instructions for creating a second network interface for sending data messages encapsulated with the overlay-network encapsulation header.

12. The non-transitory machine readable medium of claim 11, wherein the request sent to the second cluster manager comprises an address for the first application instance that is an overlay network address that is assigned to the second network interface for the first application instance.

13. The non-transitory machine readable medium of claim 12, wherein the request further comprises an indication that the first application instance is an access point for the first datacenter, wherein an address assigned to the first application instance is a publicly accessible address.

14. The non-transitory machine readable medium of claim 10, wherein the second cluster manager operates in the second datacenter.

15. The non-transitory machine readable medium of claim 14, wherein the set of instructions for sending the encapsulated first data message to the second datacenter comprises sending the first data message to the second cluster manager for the second cluster manager to forward the first data message to a third cluster manager for the second application instance.

16. The non-transitory machine readable medium of claim 10, wherein the first cluster manager operates on a same first machine as the first application instance.

17. The non-transitory machine readable medium of claim 11, wherein the request further comprises a datacenter identifier identifying that the first application instance operates in the first datacenter.

18. The non-transitory machine readable medium of claim 16, wherein the first application instance operates in a first container on the computer, wherein the first cluster manager manages at least a third application instance operating in a second container on the computer.

19. The non-transitory machine readable medium of claim 10, wherein the second cluster manager operates in the first datacenter and manages a third application instance in the application cluster.

20. The method of claim 1, wherein the second cluster manager operates in the first datacenter and manages a third application instance in the application cluster.

* * * * *